United States Patent
Takemura et al.

(10) Patent No.: US 8,392,835 B2
(45) Date of Patent: Mar. 5, 2013

(54) PARAMETER SUPPLY APPARATUS FOR AUDIO MIXING SYSTEM

(75) Inventors: Satoshi Takemura, Hamamatsu (JP);
Makoto Hiroi, Hamamatsu (JP);
Hiromu Miyamoto, Hamamatsu (JP);
Toshiyuki Ito, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1854 days.

(21) Appl. No.: 11/129,142

(22) Filed: May 13, 2005

(65) Prior Publication Data
US 2005/0254780 A1 Nov. 17, 2005

(30) Foreign Application Priority Data
May 17, 2004 (JP) .................... 2004-146929

(51) Int. Cl.
*G06F 3/16* (2006.01)
*G06F 17/00* (2006.01)
*H04B 1/00* (2006.01)

(52) U.S. Cl. ............ 715/727; 700/94; 381/119

(58) Field of Classification Search .......... 386/46, 386/125; 381/119; 700/94; 717/105; 715/727
See application file for complete search history.

(56) References Cited

U.S. PATENT DOCUMENTS

| | | | |
|---|---|---|---|
| 5,192,825 A | 3/1993 | Kunimoto | |
| 5,386,568 A | 1/1995 | Wold et al. | |
| 5,812,688 A * | 9/1998 | Gibson | 381/119 |
| 5,862,231 A | 1/1999 | Tokuhisa | |
| 6,057,829 A | 5/2000 | Silfvast | |
| H0001882 H | 10/2000 | Asthana et al. | |
| 6,327,631 B1 | 12/2001 | Eastty et al. | |
| 6,389,541 B1 | 5/2002 | Patterson | |
| 6,421,692 B1 * | 7/2002 | Milne et al. | 715/202 |
| 6,738,964 B1 * | 5/2004 | Zink et al. | 717/105 |
| 6,965,800 B2 | 11/2005 | Schmit et al. | |
| 7,164,435 B2 | 1/2007 | Wang et al. | |
| 7,165,005 B2 | 1/2007 | Steger et al. | |
| 7,392,103 B2 | 6/2008 | Takahashi et al. | |
| 7,433,745 B2 | 10/2008 | Aoki et al. | |
| 7,489,978 B2 | 2/2009 | Suyama et al. | |

(Continued)

FOREIGN PATENT DOCUMENTS

| | | |
|---|---|---|
| JP | 62-072049 A | 4/1987 |
| JP | 64-066768 A | 3/1989 |

(Continued)

OTHER PUBLICATIONS

"Polycom conference composer user guide", 2001, p. 1-29.*

(Continued)

*Primary Examiner* — Haoshian Shih
(74) *Attorney, Agent, or Firm* — Morrison & Foerster LLP

(57) ABSTRACT

In an apparatus having a display for supplying parameters to a mixing system, a first display control section controls the display to present a scene list containing identifications of each scene and configuration data of the mixing system specified by first specification data contained in each scene. A scene selection acceptance section accepts selection of a scene from the scene list presented on the display. A second display control section controls the display to present operation data of the mixing system specified by second specification data contained in the selected scene, such that the display presents each portion of the operation data. Each portion contains one option of the operation data specified by the second specification data in manner distinguishable from another option not specified by the second specification data.

12 Claims, 17 Drawing Sheets

U.S. PATENT DOCUMENTS

| | | | |
|---|---|---|---|
| 7,552,389 B2 * | 6/2009 | Drewes et al. | 715/727 |
| 7,738,980 B2 | 6/2010 | Takemura et al. | |
| 7,810,164 B2 | 10/2010 | Hiroi et al. | |
| 8,175,731 B2 | 5/2012 | Takemura et al. | |
| 2001/0030647 A1 | 10/2001 | Sowizral et al. | |
| 2002/0038308 A1 | 3/2002 | Cappi | |
| 2002/0082732 A1 | 6/2002 | Suyama et al. | |
| 2002/0107592 A1 | 8/2002 | Craig | |
| 2003/0093245 A1 | 5/2003 | Schmit | |
| 2003/0177073 A1 | 9/2003 | Ogai | |
| 2003/0212466 A1 | 11/2003 | Alferness | |
| 2004/0133291 A1 | 7/2004 | Nakayama et al. | |
| 2005/0060438 A1 * | 3/2005 | Drewes et al. | 710/10 |
| 2005/0195678 A1 | 9/2005 | Takemura et al. | |
| 2006/0037001 A1 | 2/2006 | Irie et al. | |
| 2006/0101525 A1 | 5/2006 | Hiroi et al. | |
| 2006/0143570 A1 * | 6/2006 | Washington et al. | 715/763 |
| 2008/0285757 A1 | 11/2008 | Bradley et al. | |
| 2008/0298591 A1 | 12/2008 | Bradley et al. | |
| 2009/0310800 A1 | 12/2009 | Takemura et al. | |

FOREIGN PATENT DOCUMENTS

| | | |
|---|---|---|
| JP | 04-302344 A | 10/1992 |
| JP | 7-334358 A | 12/1995 |
| JP | 11-298514 A | 10/1999 |
| JP | 2000-020377 A | 1/2000 |
| JP | 2002-278754 A | 9/2002 |

OTHER PUBLICATIONS

Digital Mixing Engine, DME 32 Owner's Manual, Yamaha Corporation, Japan.

Notice of Grounds for Rejection mailed May 14, 2009, for JP Application No. 2004-328296, with English translation, six pages.

Notice of Grounds for Rejection mailed May 14, 2009, for JP Application No. 2004-328297, with English translation, six pages.

Notification of Reasons for Refusal mailed Apr. 7, 2008, for JP Application No. 2004-060099, with English translation, six pages.

Notification of Reasons for Refusal mailed Apr. 7, 2008, for JP Application No. 2004-060100, with English translation, six pages.

Notification of Reasons for Refusal mailed Apr. 7, 2008, for JP Application No. 2004-060101, with English translation, seven pages.

Tono, I. (Sep. 2002). "Creating QuickReport Print Component (Final)," *Dephi Magazine*, 24:52-60.

Yamaha (2002). Digital Production Console, DM2000 Manual, pp. 139-147, with English translation 20 pages.

Yamaha (May 1, 2000). Digital Mixing Engine (DME 32) Owner's Manual, English version, 296 pages.

Yamaha (May 1, 2000). Digital Mixing Engine (DME 32) Owner's Manual, Japanese language version, 299 pages.

Yamaha (May 2001). Manual of Digital Mixing Engine DME32, relevant pp. 1-65, 192198, total pp. 298.

Yamaha. DME32 Version 1.1 Owner's Manual Supplement, with English translation, four pages.

Yamaha. DME32 Version 1.5 Digital Mixing Engine Owner's Manual Supplement, 16 pages.

DME 32 Version 1.5 Digital Mixing Engine Owner's Manual Supplement, (Aug. 2002). Yamaha Corporation, Japan, 16 pages.

DME32 V1.1 Owner's Manual Supplement, (Aug. 2002). Yamaha Corporation, Pro Audio & Digital Musical Instrument Division, Japan, with English Translation, four pages.

Yamaha. (Aug. 2002). Digital Mixing Engine (DME 32) Owner's Manual, English version, 296 pages.

Yamaha. (Aug. 2002). Digital Mixing Engine (DME 32) Owner's Manual, Japanese language version, 299 pages.

* cited by examiner

FIG.4 (a)
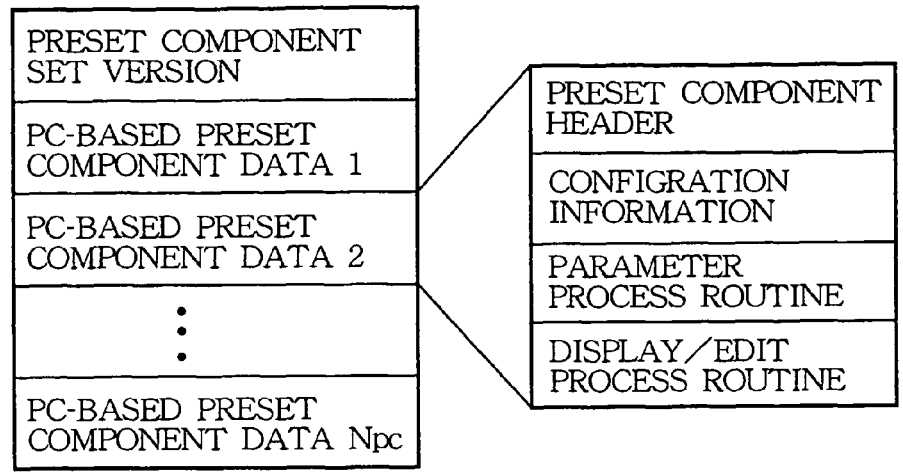
PRESET COMPONENT DATA
FIG.4 (b)
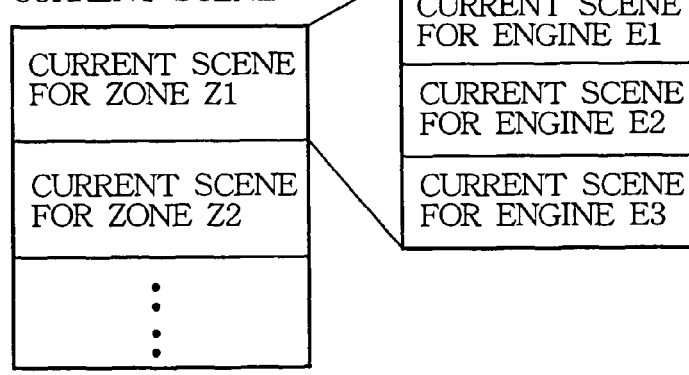
CURRENT SCENE
FIG.4 (c)
| GENERATION BUFFER OF CAD DATA FOR ENGINE TRANSFER |
|---|

PARAMETER SUPPLY APPARATUS FOR AUDIO MIXING SYSTEM

BACKGROUND OF THE INVENTION

1. Technical Field

The present invention relates to a parameter supply apparatus for supplying a sound signal processor with configuration of sound signal processes performed by the sound signal processor and with parameters used for performing the sound signal processes, and relates to a program for allowing a computer to function as such parameter supply apparatus.

2. Related Art

As known conventionally, a sound signal processor constructs a sound signal processing module using a processor that can operate according to a program. In association with the sound signal processor, application software is executed on a computer such as an external PC (personal computer) so as to function as a controller. The sound signal processor carries out the sound signal processing based on the signal process configuration edited by using the computer. Such sound signal processor is referred to as a mixer engine in this application. The mixer engine can internally store the signal process configuration edited on the PC and independently process sound signals based on the stored signal process configuration.

When the signal process configuration is edited on the controller having a display, an edit screen graphically displays components constituting a signal process and states of line connection between input and output of the components during the editing process. The display is used to edit the signal process configuration in a visually and easily understandable manner. A user can edit the signal process configuration by arranging intended process components and establishing line connection between the arranged components. For example, DIGITAL MIXING ENGINE DME32 Instruction Manual, YAMAHA CORPORATION, 2001, pp. 23-75 provides description about such mixer engine and application software.

Since the mixer engine stores a plurality of configuration data, a user can selectively use one of these configurations. Conventionally, operation data indicates parameter values used to execute a sound signal process in association with each configuration data. The mixer engine stores the operation data as a scene in association with the configuration data. When executing the sound signal process associated with the configuration data, the mixer engine accepts a scene selected by the user and performs the sound signal process in accordance with the scene content.

In this case, a display screen is used to receive instructions for calling or saving scenes. The screen only displays scene numbers and scene names for the respective scenes.

There may be a need to change the configuration of the sound signal process to be performed in the mixer engine to another prestored configuration. In order to do so, according to the prior art as mentioned above, a user needs to first select new configuration data and then select operation data indicative of parameter setup values to be used for the process. Accordingly, changing the configuration requires sequentially selecting two types of data, thus degrading the operability. The inventors have solved this problem and developed the system in which selecting a scene can select both configuration data and operation data at a time. The inventors have submitted the patent application about this invention (Jpn. Pat. Appln. No. 2004-610847, unpublished).

When a scene is designed to contain information about reference to both configuration data and operation data, there is an increasing demand for items to be edited or referenced for not only configuration data and operation data, but also the scene itself. Such demand cannot be satisfied by the conventional user interface that displays only a scene number or a scene name for each scene. Accordingly, from the user's viewpoint, there is a limited degree of freedom in editing scenes or referencing information. The operability is degraded during scene editing. When a created scene is called, its content cannot be fully referenced. Depending on cases, it is difficult to quickly call an intended scene. The operability is also degraded with this respect.

SUMMARY OF THE INVENTION

The present invention aims at solving these problems and efficiently specifying the signal process configuration of a sound signal process performed by a sound signal processor and specifying parameter values used for performing the sound signal process.

To achieve the above-mentioned object, the parameter supply apparatus according to the present invention uses a display for supplying a sound signal processor apparatus with one of configurations of sound signal process performed by the sound signal processor apparatus and parameters for use in performing the sound signal process according to the configuration. In the inventive parameter supply apparatus, a configuration storage section stores configuration data representing a plurality of the configurations. A parameter storage section stores operation data representing values of the parameters in correspondence to each of the configurations, the operation data being divided into a plurality of portions, each portion containing one or more options for the values of the parameters. A scene storage section stores scene data representing one or more scenes, each scene containing first specification data and second specification data, the first specification data specifying the configuration data representing one of the configurations, the second specification data specifying the operation data in correspondence to the configuration specified by the first specification data, such that the second specification data specifies one option for the values of the parameters in each portion of the operation data for use in the sound signal process. A first display control section controls the display to present a scene list of the scene data stored in the scene storage section, the scene list containing identifications of each scene and each configuration specified by the first specification data contained in each scene. A scene selection acceptance section accepts selection of a scene from the scene list presented on the display. A second display control section controls the display to present the operation data specified by the second specification data contained in the selected scene, such that the display presents each portion of the operation data and each portion contains the option specified by the second specification data in manner distinguishable from another option not specified by the second specification data. A data provision section accepts designation of a scene containing first specification data specifying a desired configuration and second specification data specifying a desired option in each portion of the operation data, and provides the sound signal processor apparatus with the desired configuration and the desired option of each portion of the operation data for enabling the sound signal processor apparatus to perform the sound signal process in accordance with the desired configuration while using the desired option of each portion of the operation data.

Preferably in the inventive parameter supply apparatus, a change instruction acceptance section accepts an instruction to change the first specification data contained in the selected scene presented in the display. An update section operates when the first specification data is changed according to the accepted instruction for updating the configuration as specified by the changed first specification data, and controlling the display to change the presentation of the operation data to other operation data corresponding to the updated configuration.

Preferably in the inventive parameter supply apparatus, a selection acceptance section accepts selection of an option of the operation data presented on the display and contained in the selected scene. An update section operates when the selected option is not the option specified by the second specification data of the selected scene for changing the second specification data to specify the selected option.

Preferably in the inventive parameter supply apparatus, a delete instruction acceptance section accepts an instruction to delete an unused option of the operation data. A deleting section deletes the unused option in accordance with the accepted instruction when the unused option is not specified by any of the second specification data contained in the listed scenes.

Preferably in the inventive parameter supply apparatus, the configuration storage section stores the configuration data of each configuration which configures a plurality of mixer engines contained in the sound signal processor apparatus, and the parameter storage section stores the operation data in correspondence to each configuration, such that the operation data is divided into the plurality of the portions which correspond to the plurality of the mixer engines and each portion contains one or more options for the values of the parameters applicable to the corresponding mixer engine.

Preferably in the inventive parameter supply apparatus, the configuration storage section stores the configuration data of each configuration which configures components of the sound signal processor apparatus and also configures slots equipped in the sound signal processor apparatus for connection with auxiliary devices, and the parameter storage section stores the operation data in correspondence to each configuration, such that the operation data is divided into a portion which corresponds to the components of the sound signal processor apparatus and which contains one or more options for the values of the parameters applicable to the components, and another portion which corresponds to the slots of the sound signal processor and which contains one or more options for the values of the parameters applicable to the slots.

Furthermore, the present invention can be embodied not only as the apparatus form, but also as a program which allows a computer to function as the above-mentioned parameter supply apparatus.

As mentioned above, the parameter supply apparatus according to the present invention can efficiently specify the signal process configuration of a sound signal process performed by a sound signal processor apparatus and parameter values used for performing the sound signal process. Further, the program according to the present invention can allow a computer to function as such parameter supply apparatus and provide equivalent effects.

BRIEF DESCRIPTION OF THE DRAWINGS

FIGS. 4(a), 4(b) and 4(c) are a diagram showing the contents of a part of data stored in the PC according to the present invention.

DETAILED DESCRIPTION OF THE INVENTION

The best mode for carrying out the invention will be described specifically with reference to the accompanying drawings.

Figure 1:
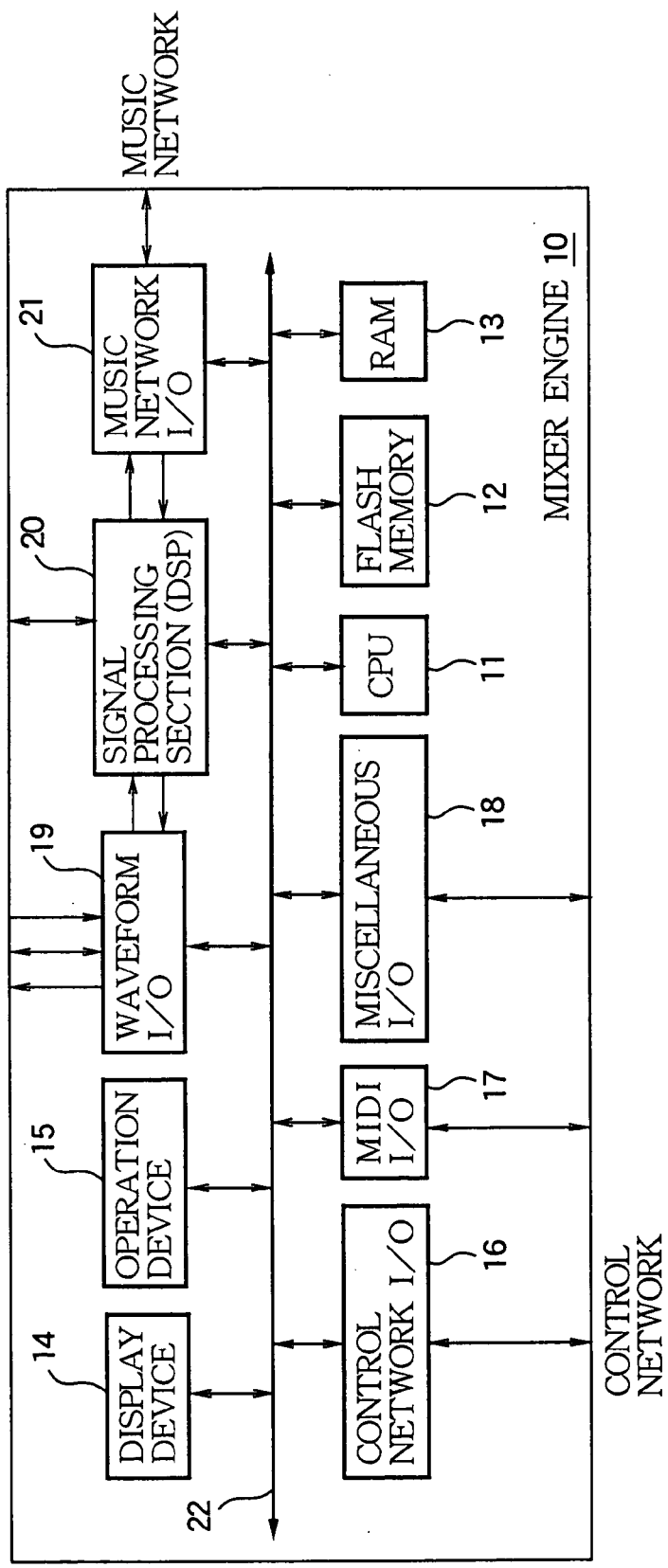
FIG. 1 is a block diagram showing the configuration of a mixer engine as an example of the sound signal processor for which the parameter supply apparatus according to the present invention provides a signal process configuration and parameters.

The following first describes an embodiment of the sound signal processor for which the parameter supply apparatus according to the present invention supplies the signal process configuration and parameters. FIG. 1 is a block diagram showing the configuration of a mixer engine as an example of the sound signal processor.

As shown in FIG. 1, a mixer engine 10 comprises a CPU 11, flash memory 12, RAM 13, an display device 14, an operation device 15, a control network input/output section (I/O) 16, a MIDI (Musical Instruments Digital Interface, registered trademark) I/O 17, a miscellaneous I/O 18, a waveform I/O 19, a signal processing section (DSP) 20, and a music network I/O 21. A system bus 22 connects these components with each other. The mixer engine generates a microprogram to control the DSP 20 in accordance with the signal process configuration received from a control apparatus that can be communicated via a control network. The mixer engine operates the DSP 20 according to the microprogram and applies various signal processes to input sound signals for output.

The CPU 11 is control section for overall controlling operations of the mixer engine 10. The CPU 11 performs the following processes by executing specific programs stored in the flash memory 12. The CPU 11 controls communication for the I/O 16 through 19 and 21 or display for the display device 14. The CPU 11 detects an operation on the operation device 15 and changes a parameter value according to the operation. The CPU 11 receives the information about the signal process configuration from the control apparatus, uses this information to generate a microprogram to operate the DSP 20, and assigns it to the DSP 20.

The flash memory 12 is rewritable nonvolatile storage section for storing a control program executed by the CPU 11 or preset component data to be described later. The flash memory 12 also stores CAD data, preset data, scene data, and the like, and functions as configuration storage section, parameter storage section, and scene storage section.

The RAM 13 functions as storage section. The RAM 13 stores information about the signal process configuration received from the control apparatus as configuration data to be described later. The RAM 13 stores various data including current data. The RAM 13 is used as work memory for the CPU 11.

The display device 14 functions as display means comprising a liquid crystal display (LCD) or the like. The display device 14 displays a screen indicating the current state of the mixer engine 10, a screen indicating the currently effective signal process configuration, the number or the name of a scene to be described, and the like.

The operation device 15 comprises keys, switches, rotary encoders, and the like. A user can use the operation device 15 to directly operate the mixer engine for scene selection and the like.

The control network I/O 16 is an interface that connects the mixer engine 10 to the control network (to be described) for communication. For example, the control network I/O 16 enables communication using such interfaces as USB (Universal Serial Bus), RS232C, IEEE (Institute of Electrical and Electronic Engineers) 1394, and Ethernet (registered trademark).

The MIDI I/O 17 is an interface to interchange MIDI standard data. For example, the MIDI I/O 17 is used for communication with a MIDI compliant electronic musical instrument, a computer having an application program to output MIDI data, and the like.

The waveform I/O 19 is an interface that accepts an input sound signal to be processed in the DSP 20 and outputs the processed sound signal. The waveform I/O 19 has slots for receiving various sound boards as auxiliary device, and can be mounted with any combination of A/D conversion boards, D/A conversion boards, and digital input/output boards. One A/D conversion board is capable of four channels of analog input. One D/A conversion board is capable of four channels of analog output. One digital input/output board is capable of eight channels of digital input/output. Actually, these boards are used to input or output signals.

The miscellaneous I/O 18 is an interface to connect the other devices than those mentioned above for input/output. For example, the miscellaneous I/O 18 provides the interface for connecting an external display, mouse, typing keyboard, operation panel, and the like.

When supplied with a sound signal from the waveform I/O 19, the DSP 20 provides this sound signal with a signal process according to the associated microprogram and current data to determine its process parameter. The DSP 20 may comprise one processor or a plurality of processors connected to each other.

When a plurality of mixer engines 10 is connected, the music network I/O 21 functions as an interface to connect to a music network to be described later and interchange sound signals with the other mixer engines. The communication system may be the same as that of the control network I/O 16. Further, the music network has an isochronous transfer feature to realtime transmit sound signals. A plurality of sound signals can be output to the other devices from a music network output terminal of the mixer engine 10. A plurality of sound signals can be input to a music network input terminal of the mixer engine 10 from the other devices.

The above-mentioned mixer engine 10 can be connected with a PC (personal computer) that can function as the control apparatus. After the signal process configuration is edited, an edit result can be transferred to the mixer engine 10. The mixer engine 10 can operate according to the edited signal process configuration. The PC can be used to transmit commands that specify operations of the mixer engine 10. In this case, the PC can also function as a parameter supply apparatus that supplies the mixer engine 10 with the configuration of the sound signal process performed by the DSP 20 and parameter values used to perform the sound signal process.

A plurality of above-mentioned mixer engines can be connected to construct a mixer system as the sound signal process system in which the connected mixer engines cooperatively perform sound signal processes. Also in this case, the PC can function as the control apparatus or the parameter supply apparatus for the overall system.

Figure 2:
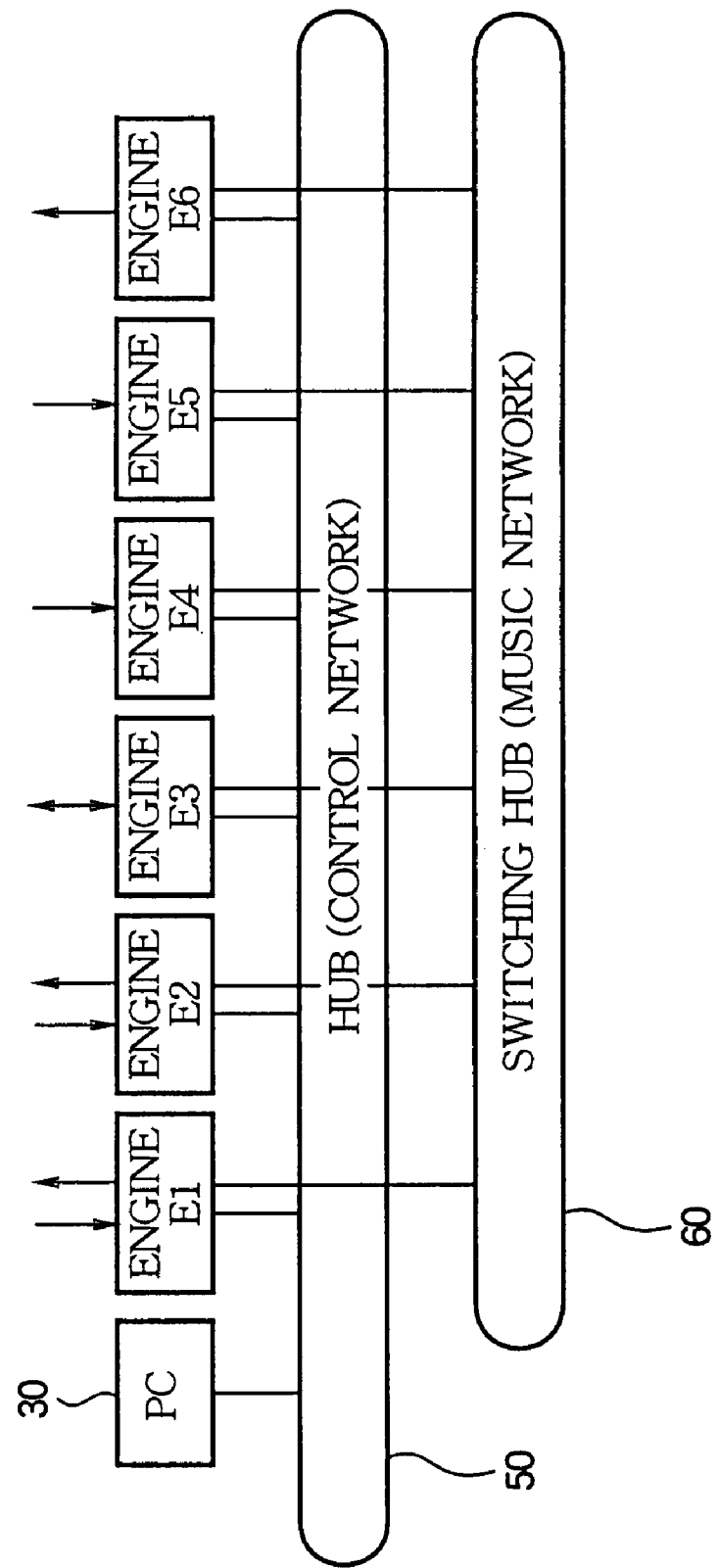
FIG. 2 is a diagram exemplifying the configuration of a mixer system constructed by connecting a plurality of mixer engines as shown in FIG. 1.

FIG. 2 exemplifies the configuration of such mixer system.

The mixer system in FIG. 2 uses a hub 50 as the control network to connect the PC (personal computer) 30 with engines E1 through E6 as the mixer engines having the configuration as shown in FIG. 1. In this manner, the PC 30 and the engines E1 through E6 can communicate with each other. In addition, the system uses a switching hub 60 as the music network to connect the engines to enable them to communicate with each other.

The PC 30 is a known hardware PC comprising a CPU, ROM, RAM, and the like, and a display as display means and may be compatible with an operating system (OS) such as Windows XP (registered trademark). The PC 30 can function as the above-mentioned control apparatus by performing a specified control program as an application program running on the OS. Unless otherwise specified, it is assumed that performing the control program implements operations and functions of the PC 30.

The PC 30 can be used to edit the configuration of a sound signal process cooperatively performed by a plurality of mixer engines. An edit result can be transferred to the mixer engines via the control network to operate the mixer engines according to the edited signal process configuration. In this case, the mixer engines interchange sound signals via the music network.

The mixer system can cooperatively operate the mixer engines in any combination. When operating the mixer engines in a plurality of groups (zones), the switching hub 60 functions to separate the music network into a plurality of partial networks as VLANs (virtual LANs) for the respective zones. In this manner, the zones can use all communication bands. Separation into the VLANs follows the contents of zone data to be described later.

It is not mandatory to use the hub 50 or the switching hub 60 for constructing the control network or the music network. Obviously, the other hardware may be used to construct networks.

According to the embodiment, the control network and the music network are provided independently. However, this is not mandatory when the network is sufficiently fast in comparison with the number of mixer engines to be connected. For example, it may be preferable to connect the PC 30 with the switching hub 60 and construct two networks using the same switching hub 60. If there are many mixer engines to be connected, the configuration in FIG. 2 is preferable because the communication bands may become insufficient.

Figure 3:
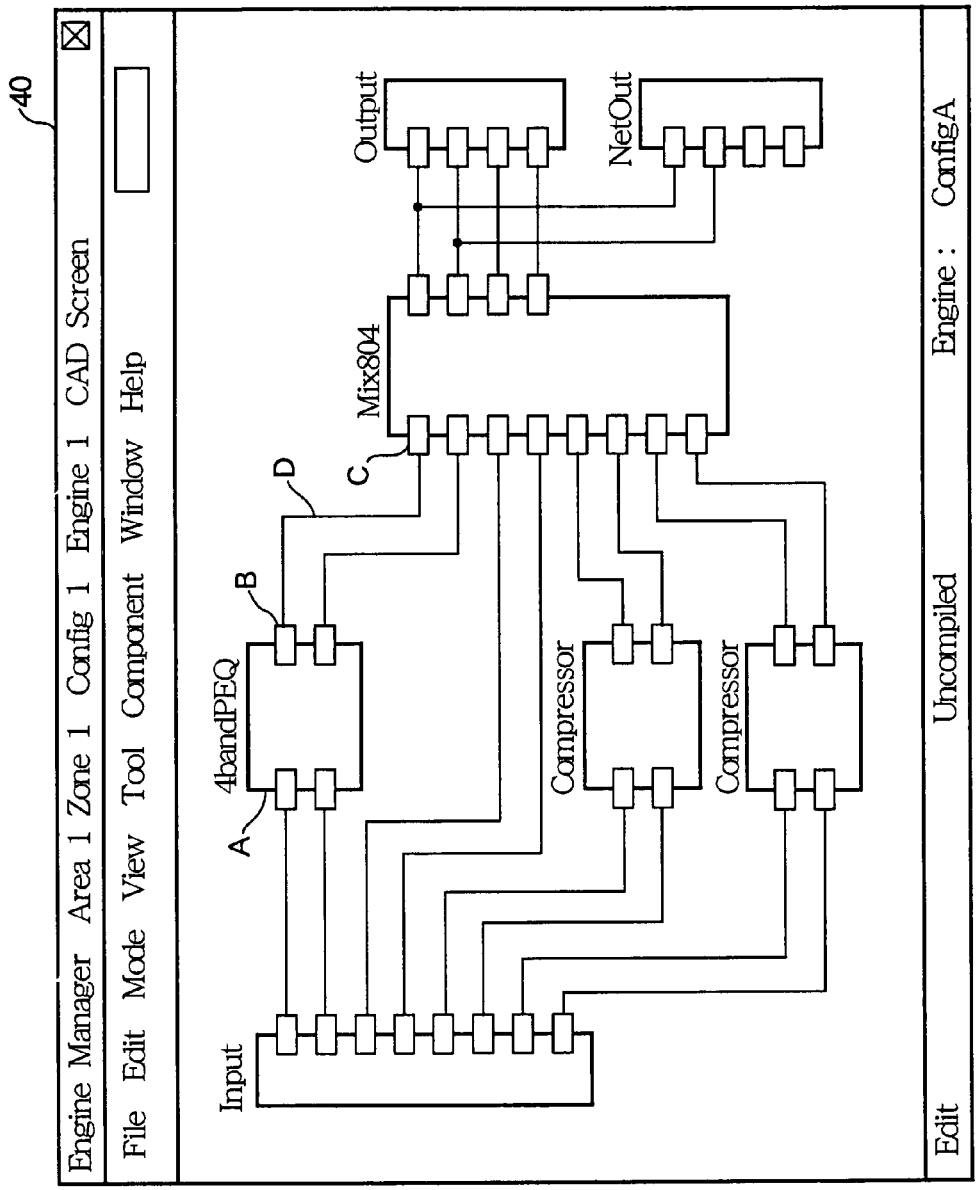
FIG. 3 is a diagram exemplifying the edit screen for the signal process configuration to be displayed on a PC display shown in FIG. 2.

The following describes a method of editing the signal process configuration on the PC 30. FIG. 3 exemplifies an edit screen for the signal process configuration displayed on the display of the PC 30.

A user can use the PC 30 to perform the above-mentioned control program and issue a necessary instruction. In this case, the PC 30 allows the display to display a CAD (Computer Aided Design) screen 40 as a graphically displayed edit screen, permitting edit instructions from the user to be accepted. The screen graphically indicates the signal process configuration being edited using its components (A) such as 4bandPEQ, Compressor, and Mix804, components' output terminals (B), input terminals (C), and connection lines (D) connecting the output and input terminals.

An input terminal is indicated at the left of each component. An output terminal is indicated at the right thereof. A component indicative of input to the mixer engine 10 has only an output terminal. A component indicative of output from the mixer engine 10 has only an input terminal. All the other components have both input and output terminals.

Using this screen, a user can edit the signal process configuration as follows. The user selects a "Component" menu to display a component list. From this list, the user chooses a component to be added to the signal process configuration and places it on the screen. The user then specifies connection lines between any output and input terminals of the arranged components.

Terminals of Input and Output components indicate input/output channels of the waveform I/O 19. Terminals of a Netout component indicate signal outputs to the other mixer engine from the music network I/O 21 via the music network. Although not shown here, it is possible to arrange a Netin component that indicates signal input from the other mixer engine via the music network.

There may be a case of editing the signal process configuration for cooperatively operating and performing a plurality of mixer engines. In this case, the CAD screen 40 can be displayed for each mixer engine to edit the signal process configuration for each engine.

When the user executes "Save" from a "File" menu, a result edited on the above-mentioned CAD screen 40 is saved as the configuration (hereafter also referred to as "config"). When the user then executes "Compile" from the "File" menu, the data format of config data can be partially converted into the data format for the mixer engine. The config data can be also transferred to the mixer engine 10 so as to be stored there.

During editing, the PC 30 calculates the amount of resource needed for the signal process in accordance with the signal process configuration on the screen. When this resource exceeds the resource for the DSP 20 in the mixer engine 10 to be edited, that signal process is unavailable. The PC 30 notifies the user of this situation.

Let us assume that each component contained in the signal process configuration is newly arranged in the signal process configuration and is compiled. At this time, a storage area is used to store operation parameters (e.g., input levels for the mixer) used for the signal process associated with the component. This storage area is secured in a current scene that stores the current data. In addition, the operation parameters are given specified initial values.

By operating a parameter control panel provided for each component later on, the user can edit operation parameters stored in the parameter storage area. When a parameter is edited and is stored in the current scene, a plurality of parameters can be stored as a preset corresponding to the configuration for each specified portion. When the mixer engine 10 performs a signal process, it is possible to call any combination of presets for the portions together with the configuration. This will be described later in detail.

Further, the user can select non-online mode or online mode as operation mode for the mixer engine 10 and the PC 30. In the non-online mode, the mixer engine 10 and the PC 30 operate independently. In the online mode, the mixer engine 10 and the PC 30 operate by mutually synchronizing operation parameters in current memory. Transition to the online mode is allowed only when the signal process configuration effective for the mixer engine 10 matches that for the PC 30. The online mode provides control (synchronization) so that the same data in the current scene is provided for the mixer engine 10 and the PC 30.

When there is a plurality of zones, the non-online mode or the online mode can be selected for each of the zones. When a zone has a plurality of mixer engines 10, the selected mode is applied to the mixer engines 10 in the zone at a time.

At the time of transition to the online mode, the user can select the current scene for the mixer engine 10 or the current scene for the PC 30 as the current scene after synchronization. Further, the user can specify to synchronize stored contents of the scene memory or each preset data.

After transition to the online mode, an operation on the PC 30 is immediately reflected on the operation of the mixer engine 10. Likewise, an operation of the operation device 15 on the mixer engine 10 is immediately reflected on the operation of the PC 30. Control is provided so that the contents of both current scenes become the same. It may be preferable to automatically enable transition to the online mode when the above-mentioned "Compile" is performed. It may be also preferable to automatically enable transition to the non-online mode when the signal process configuration is changed in the PC 30.

The following describes the configuration of data that is used for the above-mentioned mixer system and is related to the present invention.

Figure 5:
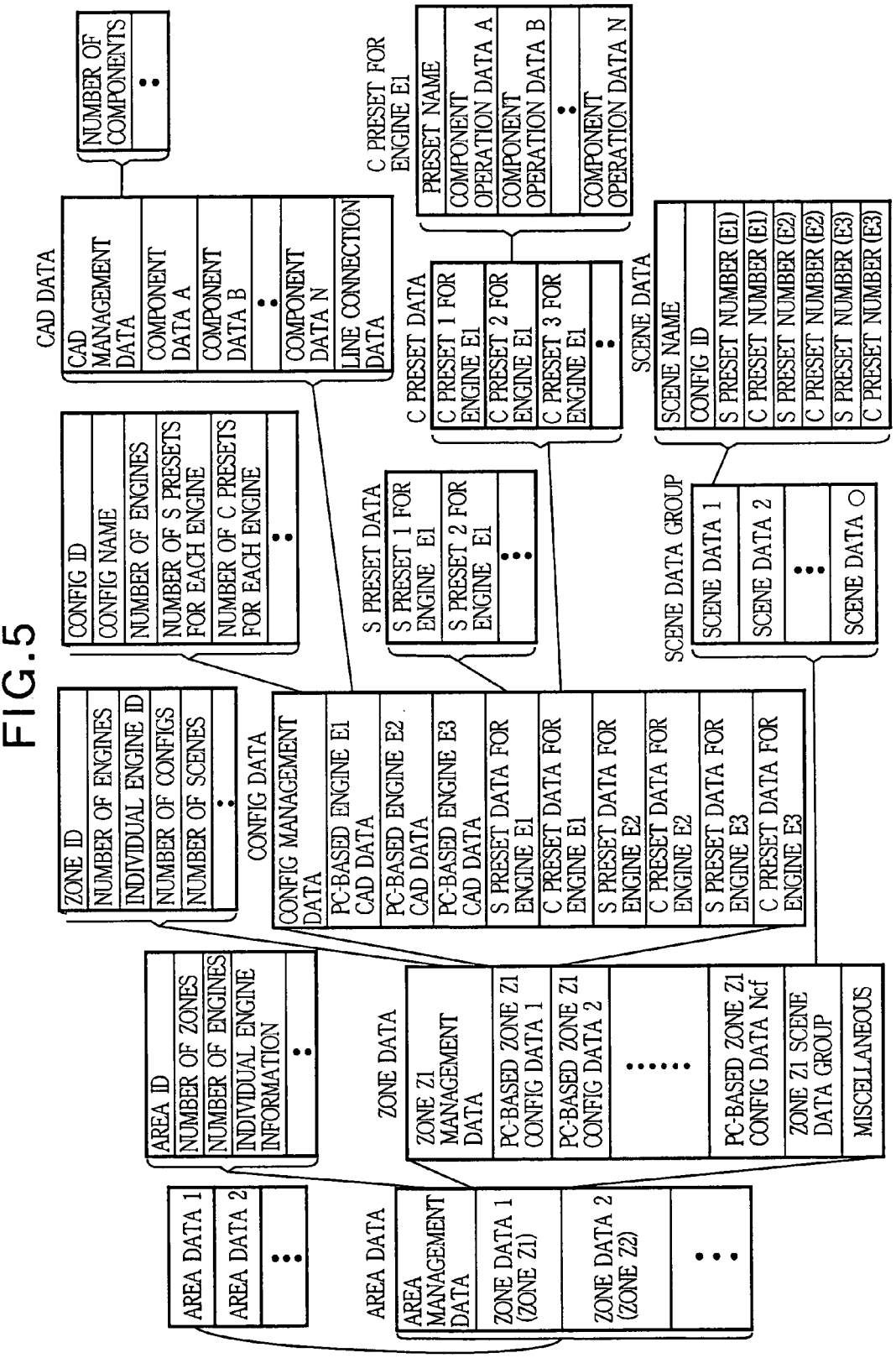
FIG. 5 is a diagram showing the contents of another part of data stored in the PC according to the present invention.

FIGS. 4 and 5 show the configurations of data stored in the PC 30.

When executing the above-mentioned control program on the OS, the PC 30 stores data as shown in FIGS. 4 and 5 in a memory space defined by the program.

Preset component data in FIG. 4(*a*) is a set of data for components that can be used for editing signal processes. Although user-customizable, the preset component data is basically supplied by a manufacturer. The preset component data contains: data for a preset component set version as version information used to control the version of an overall data set; and PC-based preset component data provided for each type of components constituting the data set.

Each PC-based preset component data is information indicative of the component's property and function. The PC-based preset component data contains a preset component header, configuration information, a parameter process routine, and a display/edit process routine. The preset component header contains an ID and the like to identify the component. The configuration information indicates the configuration of component inputs and outputs, and data and operation parameters handled by the component. In response to a user operation to input numeric values, the parameter process routine performs a process to change individual operation parameter values for each component in the above-mentioned current scene or the preset to be described. In this process, the display/edit process routine converts operation parameters for each component into text data and a characteristics graph for display.

Area data in FIG. 5 indicates the mixer system configuration in FIG. 2 and the configuration of a signal process performed in the mixer system. The area data describes various settings and information in many layers. The PC 30 can store a plurality of pieces of area data.

One area data represents information about an "area" organized by all mixer engines to be controlled by the PC 30. As shown in FIG. 5, the area data contains area management data and one of more zone data. Each zone data defines a group of one or more mixer engines belonging to the area as a "zone". The zone data represents the contents of a signal process performed by the mixer engines and parameter values used for the process.

The area management data contains an area ID indicating the area identification information, the number of zones indicating the number of zone data in the area data, the number of engines indicating the number of mixer engines belonging to the area indicated by the area data, and individual engine information indicating each mixer engine ID, the number of inputs/outputs for the waveform I/O 19, the number of inputs/outputs for the music network I/O 21, an address on the control network, and the like.

Each zone data contains zone management data, one or more PC-based config data, a scene data group, and miscellaneous data. The zone management data contains such information as a zone ID indicating the identification information about "zone", the number of engines indicating the number of mixer engines belonging to the "zone" indicated by the zone data, each engine ID indicating each mixer engine's ID, the number of configurations indicating the number of config data included in the zone data, the number of scenes indicating the number of scene data contained in the scene data group in the zone data, and the like.

The config data represents the contents of the signal process configuration edited by the user. When the user selects to save an edit result, the contents of the signal process configuration at that time are saved as one PC-based config data. Each PC-based config data contains config management data, and PC-based CAD data and preset data for each mixer engine belonging to the engine. The PC-based CAD data is configuration data indicating the contents of an edited signal process configuration's portion allocated to the mixer engine. The preset data provides a set of parameter values used for each mixer engine to perform a sound signal process indicated by the PC-based CAD data. The preset data is separately stored in a plurality of portions such as units of engines, slot (S) preset data, and component (C) preset data. This will be described later in detail.

Of these data, the config management data contains such information as: a configuration ID uniquely assigned to newly saved config data; the number of engines indicating the number of engines (normally the number of mixer engines belonging to the zone corresponding to the configuration) to perform the sound signal process in accordance with the config data; and the number of S presets and the number of C presets indicating the number of presets stored as S preset and C preset candidates to be selected for each engine.

The PC-based CAD data for each mixer engine contains: CAD management data; component data about each component for an edited signal process configuration's portion processed by (submitted to) the associated mixer engine; and line connection data indicating a line connection state between the components. When the edited signal process configuration contains a plurality of preset components belonging to the same type, different component data is provided for the preset components. The CAD management data contains data indicating the number of components in the CAD data.

Although not shown in detail, each component data contains the component's unique ID, an ID indicating to which preset component the component corresponds, and PC-based display data indicating a position and the like of the component on the edit screen of the PC 30.

The line connection data contains connection data and PC-based display data concerning each of line connections contained in the edited signal process configuration. The connection data indicates from which output terminal of which component the line connection is made to which input terminal of which component. The PC-based display data indicates a shape and arrangement of the line connection on the edit screen of the PC 30.

These pieces of PC-based CAD data are equivalent to the configuration data to be stored in the PC 30.

When each mixer engine performs a sound signal process determined by the PC-based CAD data, the preset data in the above-mentioned config data is equivalent to the operation data indicating a parameter value used for the process. The mixer system stores the preset data in a plurality of potions separately.

The PC 30 can store one or more options as S preset data and C preset data concerning each engine. Each option is referred to as a "preset" in this specification. The number of presets in the preset data may differ depending on types.

The S preset data is an input/output parameter and contains a parameter concerning an input/output board attached to the waveform I/O 19, for example. The C preset data is a parameter concerning various components in the signal process configuration edited on the edit screen described with reference to FIG. 3. That is, the C preset data is a parameter concerning a signal process performed by the DSP 20 in accordance with the components indicated by the PC-based CAD data.

The input/output parameters are configured depending on which devices are connected to the input/output terminals. In many cases, the input/output parameters are unchanged despite a change in the contents of the signal process. Accordingly, there may be a case of successively changing the component-related parameters without changing the input/output parameters, or vice versa. Such classification is preferable from the viewpoint of eliminating the need to repeatedly store unchanged portions.

Each C preset data in the C preset data contains preset name data indicating the name of the C preset and component operation data as a parameter about components constituting a portion that belongs to the signal process associated with the corresponding configuration and is performed by the associated mixer engine. The data format and arrangement of each component operation data is defined by the configuration information in the PC-based preset component data of the preset component specified by the component data contained in the PC-based CAD data. Although not shown, each S preset in the S preset data contains not only a parameter, but also preset name data indicating the S preset.

When new config data is saved, it is a good practice to: create a preset having a specified initial value for each preset data; automatically read a preset contained in the other config data; or automatically save, as a preset, the contents of the current scene at the time of saving the config data.

Such preset data is equivalent to the operation data to be stored in the PC 30.

The scene data group in the zone data contains one of more scene data. Each scene data contains a scene name indicating the scene name, a config ID specifying config data, and a preset number (equivalent to second specification data) to specify a preset used for a sound signal process corresponding to each portion of the preset data in the config data. When the config ID is determined, CAD data is specified uniquely. Accordingly, the config ID can be considered to be data that specifies the CAD data.

When the user specifies one of the scene data for each zone, the mixer engine belonging to the zone can perform the sound signal process indicated by the config data having the config ID contained in the specified scene data. In this case, the mixer engine uses parameter values associated with the preset indicated by the preset number corresponding to each portion contained in the specified scene data. A combination of the contents of the sound signal process and parameter values associated with the process is referred to as a scene.

The scene data is created when the user uses the PC to specify a scene number and instruct to save (store) the current setup state (current scene). That is, a config number indicates config data effective when the store instruction was issued. The config data contains preset numbers indicating respective portions that record the contents of the current scene. The config number and the preset numbers are saved as the scene data corresponding to the number specified in the scene data group.

Since the scene data has a small capacity, it is a good practice to secure a storage area equivalent to the maximum number of storable data items (e.g., 999) for the scene data when zone data is created. It may be preferable to register a default scene name (e.g., "scene" suffixed by a scene number) and null data. Further, it may be also preferable to secure a storage area large enough for a new scene each time it is saved.

When the preset number is saved as a scene data, a range of parameters are contained in a preset for each portion of the current scene and are saved as a preset for that number. At this time, it should be determined which portion of the current scene is contained in which range of presets. This can be determined when ensuring a storage area for the parameters in the current memory. A decision can be made during the save operation in accordance with the determination.

The above-mentioned save operation may be overwriting on an existing preset or saving a new preset. When an existing preset matches the contents of the current scene at the time of saving, the number of the existing preset can be registered to the scene data without creating a new preset.

The miscellaneous data in the zone data contains information about the line connection between mixer engines in the music network.

There have been described the principal data to be stored in the PC 30. These data may be stored in the rewritable non-volatile storage section such as an HDD (hard disk drive) and may be read to the RAM for use as needed.

In addition to the above-mentioned data, as shown in FIG. 4(*b*), the PC 30 also stores current scenes indicating currently effective parameter values in the currently effective configuration. In the mixer system, the mixer engine can independently operate on a zone basis. Accordingly, the current scene is provided for each zone. Data of the current scene in each zone is configured by linking presets in each portion of the above-mentioned preset data. Although not shown in detail, the data is formed by combining parameters (S preset) for input/output boards with parameters (C preset) for each component. The preset name needs not be included.

A control panel or the like can be used to edit parameter values concerning the input/output boards and the components in the signal process configuration. In this case, a parameter value in the current scene can be changed and the result can be saved as a preset for each portion.

Further, as shown in FIG. 4(*c*), the PC 30 is also provided with a buffer to generate engine-transfer CAD data having a format suited for processing in the mixer engine 10 from the PC-based CAD data when the above-mentioned "Compile" process transfers and supplies config data to the mixer engine 10. The system generates the engine-transfer CAD data to be transferred to each mixer engine as follows. The system extracts portions concerning a transfer destination engine from the PC-based CAD data. The system deletes such unnecessary data for the mixer engine 10 as data used for displaying components or line connections on the PC 30. The system further compacts to remove unused portions between data.

Figure 6:
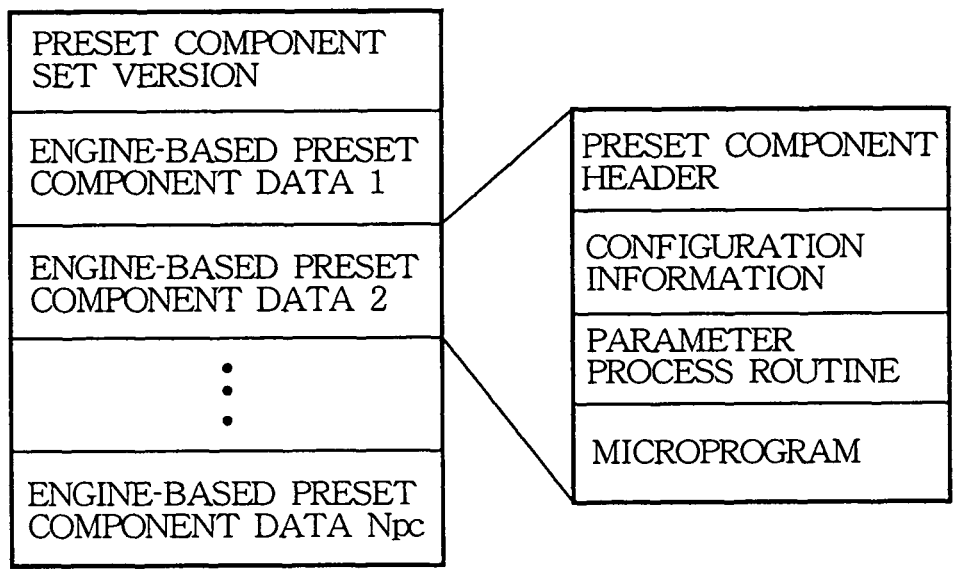
FIGS. 6(a), 6(b) and 6(c) are a diagram showing the contents of a part of data stored in the mixer engine according to the present invention.
Figure 6:
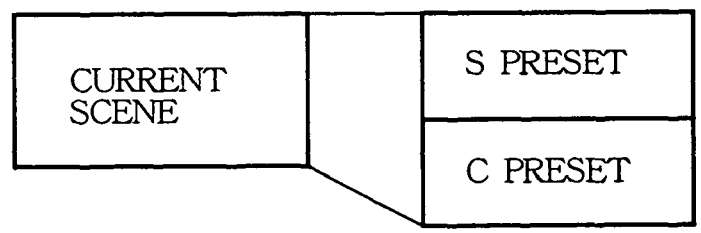
Figure 6:
Figure 7:
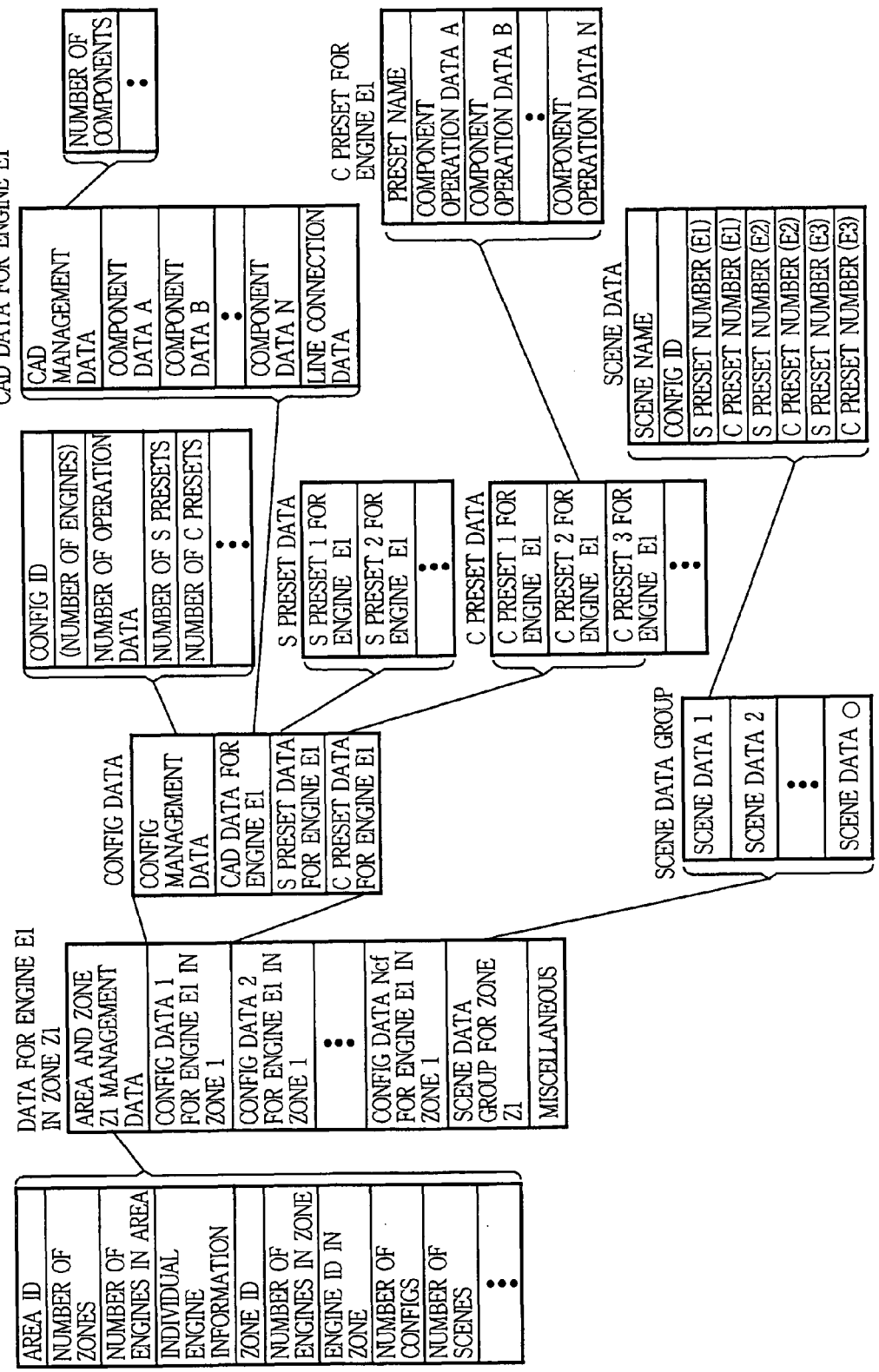
FIG. 7 is a diagram showing the contents of another part of data stored in the mixer engine according to the present invention.

FIGS. 6 and 7 show the configurations of data to be stored in the mixer engine 10. While FIGS. 6 and 7 representatively show data to be stored in the engine E1 as shown in FIG. 2, the other mixer engines are also based on the same principle about the data configuration.

As shown in FIGS. 6 and 7, the engine E1 mainly stores preset component data and zone data about a zone (zone Z1 in this example) to which the engine E1 belongs. The preset component data is stored in the flash memory 12 with configuration contents slightly different from those of the PC 30. The zone data is stored in the RAM 13. When the sound signal process is performed in the zone Z1 to which the engine E1 belongs, the zone data is used for part of the sound signal process assigned to the engine E1. The zone data is created by processing zone data for the PC 30. The following describes these data chiefly with respect to differences from the data to be stored in the PC 30.

As shown in FIG. 6(*a*), preset component data for the engine E1 contains engine-based preset component data. The engine-based preset component data is used for the engine E1 to perform a sound signal process concerning each component. The engine-based preset component data contains a microprogram in place of part of a display/edit routine so that the DSP 20 can be operated to function as the component. This is a difference from the PC-based preset component data.

The mixer engine 10 does not edit the signal process configuration or display operation parameters using characteristics graphs. While the PC-based configuration information contains the display data and the display/edit routines, the mixer engine 10 does not contain some routines such as a routine to display characteristics graphs. The mixer engine 10 can allow the display device 14 to display parameter setup values and allow the operation device 15 to edit these values. In this case, the mixer engine 10 requires a routine out of the PC-based display/edit routines, i.e., a routine to convert an operation parameter value into text data for display. This routine is contained in the parameter process routines.

The other requirements are the same as those of the preset component data for the PC 30. The mixer engine 10 uses IDs and versions equivalent to the corresponding sets and components for the PC 30 so that the correspondence can be identified.

As shown in FIG. 7, the zone data contains area and zone management data, one or more config data, and a scene data group. The mixer engine is configured so that one mixer engine does not simultaneously belong to a plurality of zones. Consequently, the engine E1 stores only one zone data.

The area and zone management data provides information about a zone associated with the zone data and about an area to which the zone belongs. The area and zone management data is a combination of the area management data stored in the PC and the information contained in the zone management data. That is, the area and zone management data contains: an area ID, the number of zones, the number of engines, and individual engine information in the area management data; and a zone ID, the number of engines in zone, engine IDs in zone, the number of configurations, and the number of scenes in the zone data.

The config data contains config management data, CAD data for engine E1, and S and C preset data for engine E1. The config management data is similar to that for the PC-based config data (information such as the number of engines and the number of presets for the other mixer engines is unnecessary and may be deleted). The CAD data for engine E1 is generated by deleting the PC-based display data from the CAD data for PC engine E1 as shown in FIG. 6 and performing the compaction as mentioned above. Each preset data for engine E1 is similar to that as shown in FIG. 5 and contains data about one or more presets.

The other requirements are the same as those of the config data for the PC 30. The mixer engine 10 uses IDs and versions equivalent to the corresponding configurations and components for the PC 30 so that the correspondence can be identified.

A config number is related to each scene data contained in the scene data group and is common to the engines in the zone. Further, a preset number just needs to be configured not to reference data related to the other mixer engines. The preset number has a very small amount of data. Leaving the preset number undeleted is insignificant from the viewpoint of the amount of data. Each mixer engine 10 stores the scene data in completely the same manner as the PC 30 to simplify the process. Of course, it is preferable to extract only portions used by the mixer engine to be stored.

As shown in FIG. 6(b), the engine E1 also stores the current scene that is setup data to be reflected on a signal process performed by the DSP 20. Data of the current scene is configured to be a combination of S and C presets for the engine E1 as mentioned above. Since the engine E1 does not simultaneously belong to a plurality of zones, the current scene is stored with respect to only the zone to which the engine E1 currently belongs.

The mixer engine 10 processes sound signals based on the signal process configuration edited on the PC 30. To do this, the CPU 11 generates a microprogram the DSP 20 executes based on the engine-based CAD data received from the PC 30. As shown in FIG. 6(c), there is provided a microprogram generation buffer as a work area for this purpose.

A microprogram generation process takes place as follows. The system sequentially reads a microprogram from the preset component data specified by IDs of the components contained in the engine-baled CAD data. The system allocates resources such as input/output registers, delay memory, and storage registers needed for the components' operations. Based on the allocated resources, the system processes the microprogram and writes it to the microprogram generation buffer.

At this time, the system also writes to the microprogram generation buffer a program to interchange data between input/output registers corresponding to the components' input/output terminals based on the line connection data contained in the engine-based CAD data.

Processing the microprogram based on the resource allocation complies with the architecture of the DSP 20 provided for the mixer engine 10. Another architecture may have to provide the DSP 20 with parameters corresponding to the allocated resources instead of processing the microprogram itself, for example.

As mentioned above, the mixer system allows the PC 30 and the mixer engine 10 to store, as scene data, the process configuration of sound signal processes and a combination of parameters used to perform a sound signal process associated with the process configuration. When a user specifies the sound signal process configuration and parameters used to perform the process, the system accepts the user's specification in the form of an instruction to call a scene.

Figure 8:
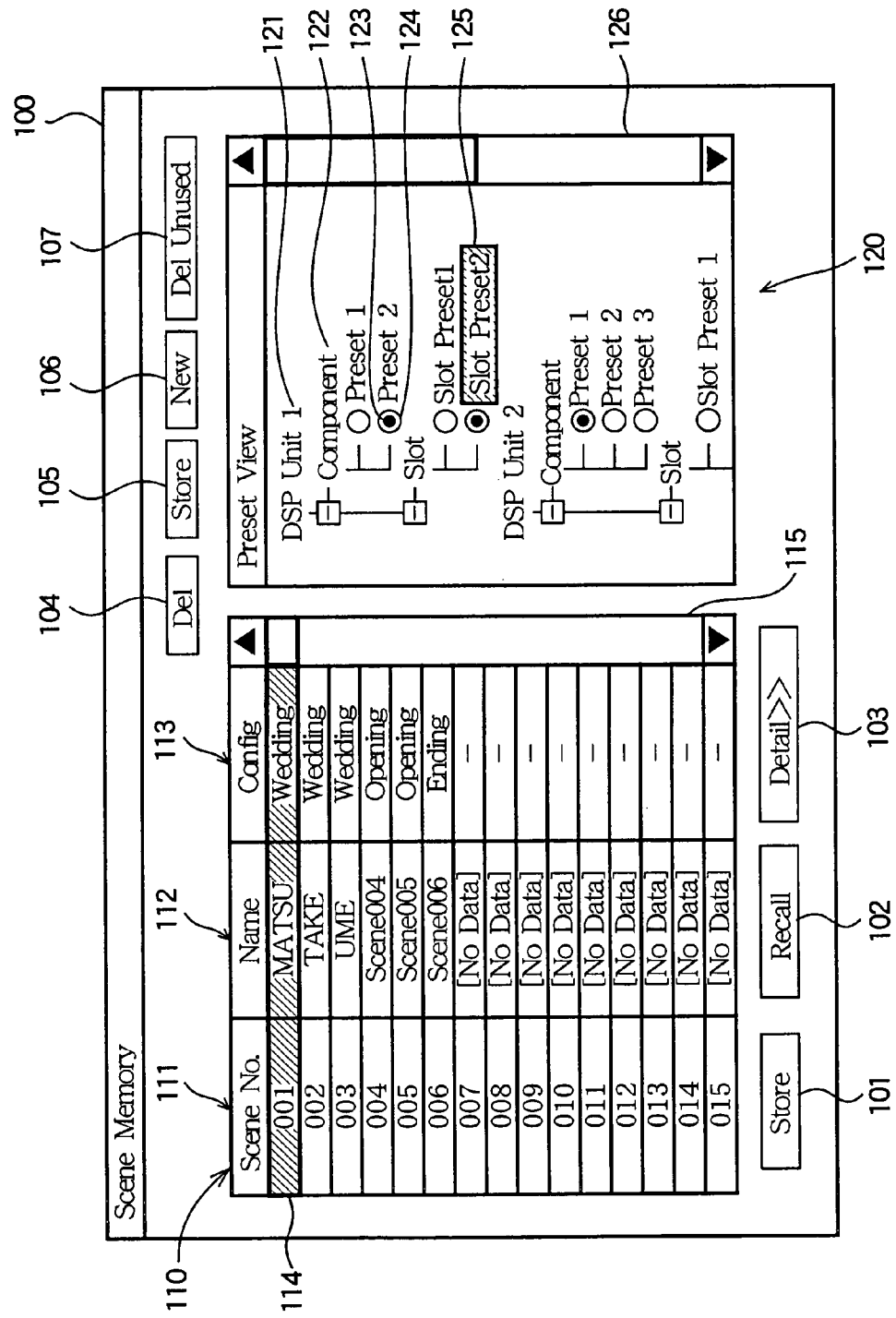
FIG. 8 is a diagram exemplifying the scene memory edit screen displayed on the PC display shown in FIG. 2.
Figure 9:
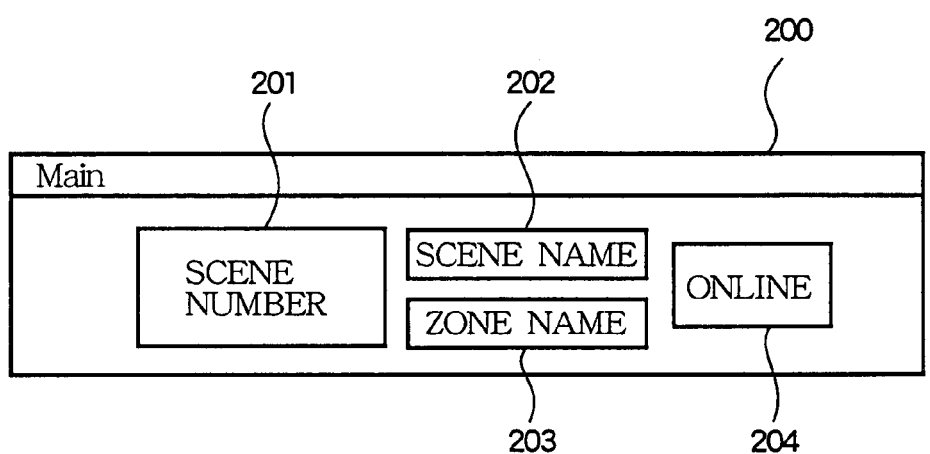
FIG. 9 is a diagram exemplifying the main screen displayed on the PC display shown in FIG. 2.

To accept the user's specification, the PC 30 allows the display to display a scene memory edit screen as shown in FIG. 8 or the main screen as shown in FIG. 9. The screen functions as the GUI. The scene memory edit screen is suitable for editing scenes. The main screen is suitable only for selecting scenes.

A scene memory edit screen 100 in FIG. 8 is described first.

The scene memory edit screen 100 mainly displays a scene list 110 and a preset view 120. The scene list 110 and the preset view 120 themselves function as the GUI. The scene memory edit screen 100 also displays various buttons 101 through 107 to accept instructions to operate scenes and presets.

The scene list 110 contains a scene number display column 111, a scene name display column 112, and a config name display column 113. These display columns respectively display a scene number, a scene name, and a name of config indicated by the config ID contained in the scene on each row. In the scene list 110, each display column displays the scene's number and name as already defined identification information about each scene. Correspondingly to this, the config name is displayed as the identification information about config indicated by the config ID contained in each scene, i.e., config used for the scene.

It is assumed that 999 scenes can be registered. An unregistered scene is only indicated with its scene number, [No Data] for its name, and "-" for its config name. Since the scene list 110 cannot display these pieces of scene information at a time, a scroll bar 115 can be operated to scroll the list.

The scene list 110 can accept a user's instruction to select scenes by means of a pointing device such as a mouse. The user can click any row in the scene list to select the scene corresponding to the row. An unregistered scene can be selected. The selected scene is indicated by a cursor 114. When a different scene is selected, the PC 30 updates the display of the preset view 120 accordingly.

The CPU of the PC 30 functions as first display control section and scene selection acceptance means for displaying the scene list and accepting an instruction to select scenes as mentioned above.

At the bottom of the scene list 110, a Store button 101 and a Recall button 102 are provided to enable operations for the selected scene. When a config is enabled, pressing the Store button 101 registers that config's ID and current scene contents to the selected scene and saves it. It may be preferable to specify a scene name for saving. However, processes or operations can be simplified by saving the scene with a default name and modifying it later. At this time, a new preset can be created as needed to register the current scene contents as described with reference to FIG. 5.

Pressing the Recall button 102 recalls the contents of the selected scene onto the current scene. That is, the current scene is overwritten with the contents of the presets used for the selected scene. At this time, the currently activated config may differ from the config specified in the scene to be recalled. In such case, the config is changed first. When the mixer engine 10 is online, the contents of the recalled scene are reflected on the sound signal process in the mixer engine. Pressing the Recall button 102 accepts the specification of the scene whose contents are to be reflected on the sound signal process.

Pressing the Store button 101 and the Recall button 102 to perform processes may inadvertently delete the created data by overwriting. It is a good practice to prompt the user to confirm whether or not he or she is sure to press the button. The CPU of the PC 30 functions as data provision means for calling scenes and accepting instructions for mixer engines.

When a scene is selected in the scene list 110, a user's click on the scene name display column 112 allows input of a new scene name to be accepted. This enables an instruction to change the scene name. When a user clicks the config name display column 113, a combo box, a pull-down menu, or the like is used to select an intended one of configs contained in the zone data. This enables an instruction to change the config. These change instructions may be assumed to be issued when a new scene name is input or a new config is selected or when the save operation is later performed by the Store button 101 or any other buttons (not shown).

When these changes are instructed, the PC 30 changes data for the scene name or the config ID in the corresponding scene data. Further, changing a config ID also changes the preset number so as to specify the default preset (e.g., the smallest number) out of presets for the portions stored for the new config. The display of the preset view 120 changes accordingly. These changes are equivalent to scene editing.

A Detail button 103 toggles displaying and hiding the preset view 120 and buttons 104 through 107.

The preset view 120 is equivalent to the preset display screen. When a scene is selected in the scene list 110, the preset view 120 functions as a display section to display names of presets for the config used for the selected scene. The preset names are used as information to identify presets for portions registered in the config data associated with the config. In this display, presets of saved parameters for each portion are classified into types corresponding to the portion. When a preset is specified to be used for the selected scene, the preset can be distinguished from the other presets.

Presets are displayed in a tree. A radio button 124 is displayed to the left of each preset's name. A mark 124a in the radio button 124 identifies a preset to be used for the selected scene. The tree's branches are provided for respective mixer engines (the level denoted by the reference numeral 121) and respective types of presets (the level denoted by the reference numeral 122) in each mixer engine. A list of registered presets (the level denoted by the reference numeral 123) is displayed for each type. The mark 124a of the radio button 124 is enabled for only one preset in each type.

When the preset view 120 cannot display all the preset information at a time, the scroll bar 126 can be used to scroll the view.

The CPU of the PC 30 functions as second display control section for displaying the preset view as mentioned above.

In the preset view 120, the radio button 124 can be used to enable selection (change instruction) of a preset used for the scene selected in the scene list 110. When the user operates the radio button 124, the PC 30 changes the preset number corresponding to the operated radio button 124 to the number indicating the newly selected preset to change the preset used for the scene. The preset number corresponding to the operated radio button 124 is contained in the scene data associated with the selected scene. This change is also equivalent to scene editing.

In the preset view 120 like the scene list 110, clicking the preset moves the cursor 125 to the clicked position to select the preset. The selected preset permits input of a new preset name to be accepted, enabling an instruction to change the preset name. Directing this change, if any, changes data for the preset name in the corresponding preset.

In this manner, the scene list 110 and the preset view 120 can be used to accept instructions to newly create, change, or save parameters in the scene data or the preset. That is, it is possible to accept instructions to define the scene.

A Del button 104, a Store button 105, a New button 106, and Del Unused button 107 are used to accept operations for presets displayed in the preset view 1203 When the Del button 104 is pressed, the PC 30 deletes a preset where the cursor 125 is positioned. It is a good practice to prevent a preset to be used for any scene from being deleted. The last preset in each portion cannot be deleted. Each portion should contain at least one preset.

When the Store button 105 is pressed, the PC 30 overwrites the preset located by the cursor 125 with the corresponding portion of the current data for saving. When the New button 106 is pressed, the PC 30 creates various types of new presets and saves the corresponding portion of the current data in each of the created presets. However, these operations don not take place when the config effective at the press of the New button 106 differs from a config that is displaying the preset in the preset view 120.

The Del Unused button 107 accepts an instruction to delete unused presets. Pressing this button deletes all presets not used for any scenes in the corresponding config, i.e., all presets whose preset numbers are not registered to any scene data. The deletion may be effective for the config whose presets are being displayed in the preset view 120. Further, the deletion may be effective for all configs in the selected zone, all configs in the selected area, or all configs the PC stores.

This function makes it possible to easily delete unnecessary presets, e.g., due to duplication even though a new preset is created each time a new scene is saved. Accordingly, it is possible to not only decrease the memory capacity needed to store the preset data, but also keep the display of the preset view in an easily visible state.

Pressing the buttons 104 through 107 to perform processes may also inadvertently delete the created data. It is a good practice to prompt the user to confirm whether or not he or she is sure to press any of the buttons. When these processes are performed, it is a good practice to store the state before the processes or a difference between them so that an undo operation can be used to easily resume the state before the process. The OS's undo function, if provided, can be used as is.

The following describes the main screen 200 in FIG. 9.

The main screen 200 accepts basic instructions to control operations of an edit/control program in the PC 30. The main screen 200 uses various icons, toolbars, and the like that are not directly related to features of the embodiment and are therefore not shown. In response to operations of the icons and toolbars, the main screen 200 can toggle displaying and hiding various screens that are displayed in accordance with the functions implemented by the control program. These screens include the CAD screen 40 in FIG. 3 and the scene memory edit screen 100 in FIG. 8, for example. The main screen 200 can accept instructions about settings and the like concerning overall operations of the control program.

That is, the main screen 200 is provided with interfaces needed for normal operations. For fine tuning, the main screen 200 is first used to direct another screen to be displayed. The latter displayed screen is used for operations such as settings.

The main screen 200 can also accept scene selection. That is, a scene number display section 201 is provided with a menu. Any scene can be selected from the menu to be recalled as a current scene. Also in this case, a value of the parameter to be recalled is registered to the preset for each portion specified by the preset number in the scene data. If needed, the config used for the signal process is changed. A scene name display section 202 displays the name of the recalled scene.

A zone name display section 203 displays the name of a zone where scenes can be currently selected from the scene number display section 201. The zone name display section 203 also has a menu. An intended zone can be selected from the menu to switch between zones. When the zone is switched to another while the scene memory edit screen 100 is displayed, the display contents of the scene memory edit screen 100 also change to those of the zone after the change.

An online button 204 is used to accept an instruction to change operation modes for the PC 30 and the mixer engines 10. When the user presses this button, the PC 30 toggles operation modes between online mode and non-online mode.

There has been described the screens the PC 30 displays on the display. These screens may be used to accept an instruction from the user to change data in the PC 30. When the PC 30 and the mixer engines 10 operate in the online mode in such case, The change is immediately reflected also on the mixer engines 10, i.e., on the contents of the signal process.

With reference to flowcharts in FIGS. 10 through 17, the following describes processes performed by the CPU of the PC 30 upon reception of various instructions from the user using the screen in FIG. 8 or 9 and a process accordingly performed by the CPU 11 of the mixer engine 10.

Figure 10:
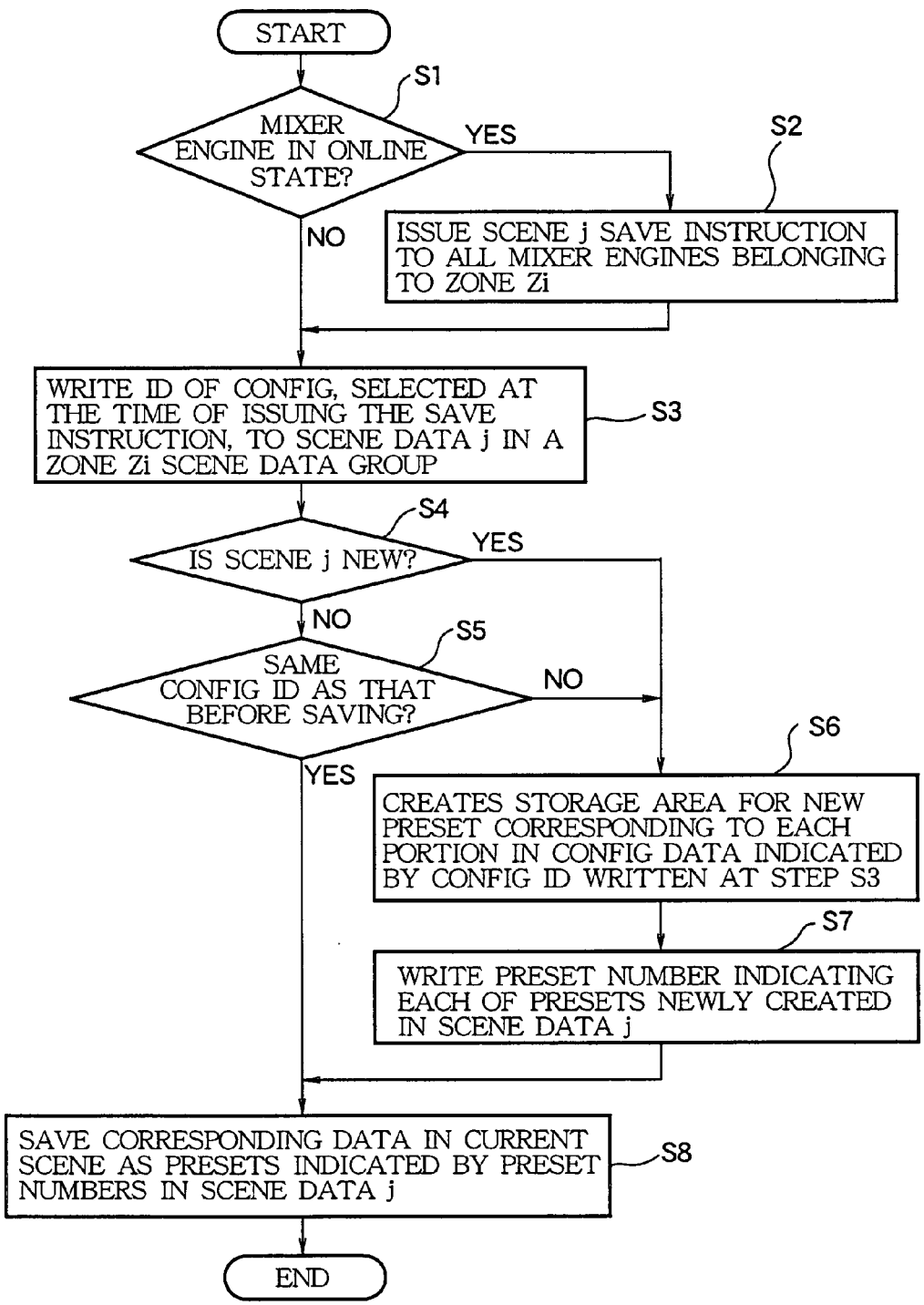
FIG. 10 is a flowchart of the process performed by the PC's CPU shown in FIG. 2 when receiving an instruction to save scene j in zone Zi.

FIG. 10 shows a flowchart showing the process performed by the CPU of the PC 30 when it receives an instruction to save scene j in zone Zi.

When the Store button 101 is pressed, for example, the CPU of the PC 30 accepts an instruction to save the scene and starts the process according to the flowchart shown in FIG. 10. When the mixer engine 10 is operating in the online mode (hereafter referred to as the "online state"), the process proceeds to step S2 from step S1. At step S2, the process references zone Zi management data, issues a scene j save instruction to all the mixer engines 10 belonging to zone Zi, and then proceeds to step S3.

This instruction commands the mixer engine 10 like the PC 30 to save scene j. The purpose of issuing such instruction is to ensure the same contents of scene data and presets between the PC 30 and the mixer engine 10 and to ensure the current scene synchronization even when a scene is recalled. Data used by each mixer engine corresponds to only a signal process configuration's portion allocated to the mixer engine. It is not always necessary to keep the other portions to be the same.

When the mixer engine 10 is operating in the non-online mode (hereafter referred to as a "non-online state"), the process directly proceeds to step S3.

At step S3, when a config is selected at the time of issuing the save instruction, the process writes this config's ID to scene data j in a zone Zi scene data group. In the description below, the "scene data", unless otherwise specified, signifies that used for a zone to be processed.

Thereafter, it may be determined that scene j as save destination is a new scene. Even though scene j is an existing one, it may be determined that the config ID of scene j differs from that before the save operation. In these cases, the process proceeds to step S6 from step S4 or S5. The process creates a storage area for a new preset corresponding to each portion in the config data indicated by the config ID written at step S3. At this time, the preset may have the default name. The data may be null. At step S7, the process writes a preset number indicating each of the presets newly created in scene data j, and then proceeds to step S8.

When scene j as save destination is an existing one and the config ID is unchanged, the process directly proceeds to step S8 from step S5.

At step S8, the process saves the corresponding data in the current scene as presets indicated by the preset numbers in scene data j. The process then terminates. The save operation is overwriting to the existing preset when the process directly proceeds to step S8 from step S5. The save operation is saving a new preset when the process passes through steps S6 and S7.

According to the above-mentioned process, the PC 30 can save the contents of the current scene as scene data in accordance with instructions from the user. In this case, the config data stores parameter values themselves divided into a plurality of portions. Reference to the information about the config ID and the preset numbers in the scene data makes it possible to identify which parameter should be read to recall the scene.

The above-mentioned process provides the example of overwriting the scene data to the existing presets when the scene as save destination is an existing one and the config ID is unchanged. However, this is not mandatory. It is possible to adopt the other processes to be described later, for example. The process does not specify scene names in particular. Accordingly, the default scene name is used when a new scene is specified as save destination. The original scene name is used when the existing scene is specified as save destination. However, it is also possible to accept the scene name specification and write the scene name to the scene data.

When receiving an instruction to save scene j, the CPU 11 of the mixer engine 10 performs almost the same process as that at step S3 and later in FIG. 10. This is because the scene j save instruction is issued to save scene j in the mixer engine 10 like the PC 30 as mentioned above. When the PC 30 receives the scene j save instruction issued at step S2 in FIG. 10, the CPU 11 of the mixer engine 10 starts a process equivalent to that at step S3 and later in FIG. 10.

However, the process slightly differs from that shown in FIG. 10 because data stored in the PC 30 slightly differs from data stored in the mixer engine 10. For example, the mixer engine 10 stores only one zone data. Unlike step S3 in FIG. 10, the mixer engine need not select zone data to be referenced from a plurality of zone data.

The process at step S6 or S8 creates or saves only a preset that is used in the mixer engine to be processed. As shown in FIG. 5, the mixer engine stores preset numbers of all the presets. Also in this case, at step S7, the process just needs to save preset numbers of the presets used in the mixer engine to be processed. This is because the other preset numbers are neither used nor copied to the PC 30. No problem arises if obsolete data or null data remains.

When receiving an instruction to save the scene, the CPU of the PC performs the process in FIG. 10. In addition, for example, steps S4 through S7 in FIG. 10 can be replaced by a process according to the flowchart in FIG. 11.

To use this process, an edit flag needs to be provided for each "portion" to be stored as one preset with respect to the current scene. When the scene is recalled or saved, or when the default parameter is recalled to start editing a new parameter, the process sets all the edit flags to "0" indicating "no editing". When a parameter is changed for the corresponding portion, the process sets the edit flag to "1" indicating "editing provided". When the config is changed during editing, the process sets all the edit flags to "1".

When this process is used, step S3 in FIG. 10 is followed by determinations (S11, S12) similar to those at steps S4 and 5 in FIG. 10. Scene j instructed to be saved may be a new one. Alternatively, scene j may not be a new one and may be saved with a config ID different from the one before the saving. In these cases, the process proceeds to step S13 to define a first portion of the current scene as a process target. This "portion" is also stored as one preset in the current scene.

When the portion as the process target has the edit flag set to "1", the process proceeds to steps S15 and S16 from step S14. Like steps S6 and S7 in FIG. 10, the process creates a new preset and writes its number to scene data j. At this time, the process processes only a preset corresponding to the portion as the process target.

At step S17, the process defines the next portion of the current scene as a process target. When the next portion is available, the process returns to step S14 from step S18 to repeat. When the next portion is unavailable, the process proceeds to step S8 in FIG. 10 to save data for the portions in the current scene and then terminates.

When the edit flag is set to "0" at step S14, no change is made to the parameter associated with the preset in that portion from the time the preset was recalled or saved. It is unnecessary to create a new preset. The process proceeds to steps S19 and S20. The process detects the most recently recalled or saved preset from the portion as the process target. The process writes the preset number indicating the preset to scene data j. The process then proceeds to step S17 to continue. With respect to the scene whose edit flag is set to "0", the preset is not changed from the time it was read. Therefore, the write operation at step S8 may be omissible.

When it is determined at steps S11 and S12 that scene j is an existing one and the config ID is the same as the one before the save operation, the process directly proceeds to step S8. The process is the same as that shown in FIG. 10.

The above-mentioned process can also allow the PC 30 to save the contents of the current scene as scene data in accordance with instructions from the user. When this process is used, no preset is newly created, but the existing preset is referenced with respect to the portion not changed from the time it was recalled or saved last. There is no need to create more presets than needed, making it possible to decrease the storage capacity needed to store presets. This effect is especially advantageous when the process is expected to be a repetition of slightly changing the scene and saving it.

Figure 11:
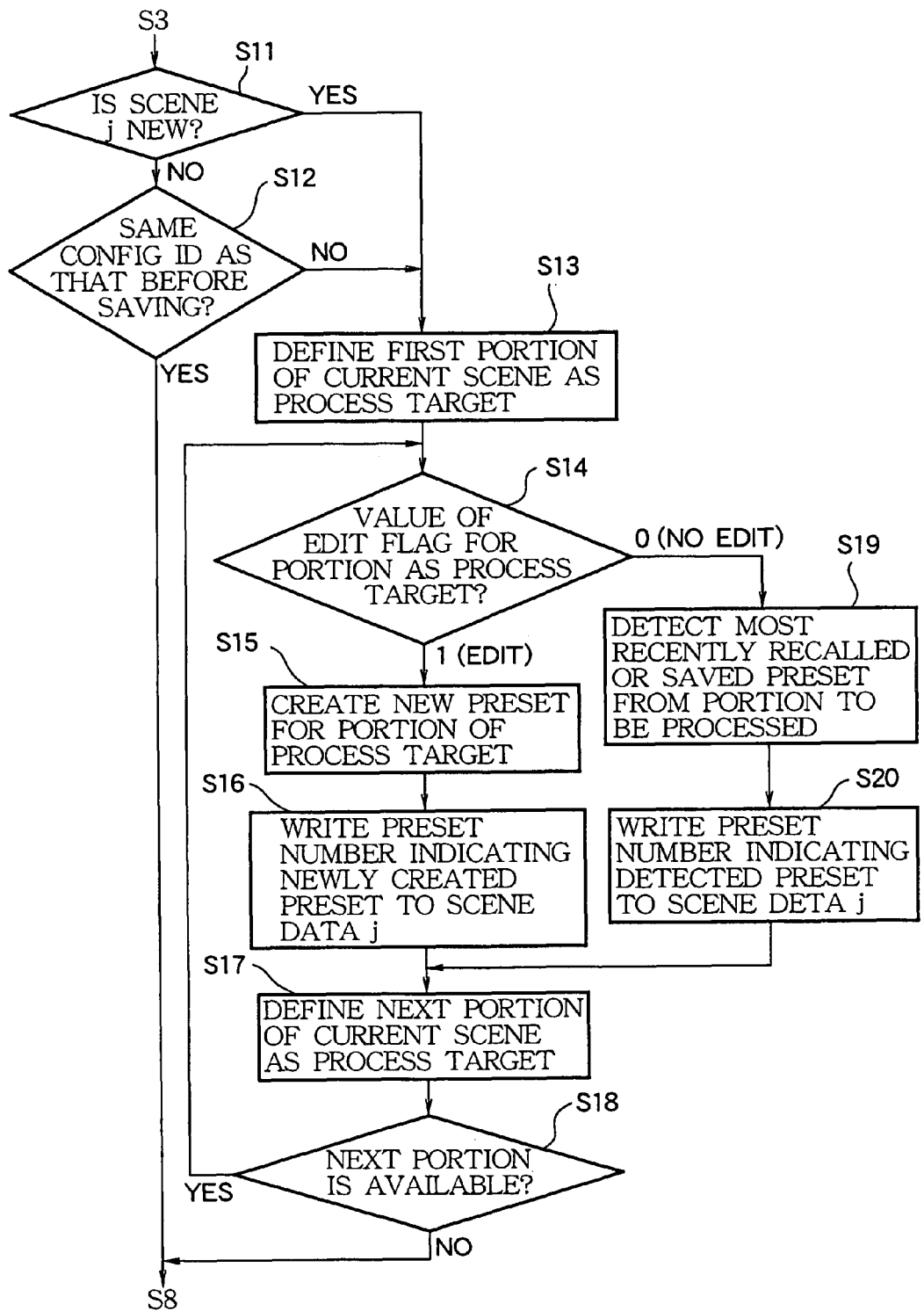
FIG. 11 is a flowchart showing another example of the process in FIG. 10.

It may be preferable to allow the user to select the process as shown in FIG. 10 or its modification process as shown in FIG. 11. It is obviously possible to adopt the other processes.

When receiving the scene j save instruction in this case, the mixer engine 10 performs the process as shown in FIG. 11 like the PC 30, i.e., a replacement for the process at steps S4 through S7 in FIG. 10, after step S3 in FIG. 10. A difference from the process on the PC 30 is similar to that described when the process in FIG. 10 is used. Another difference is that the process target at steps S13 and S17 in FIG. 11 corresponds to only a "portion" associated with the preset to be stored in the mixer engine used for the process.

The mixer engine 10 may independently manage the edit flag. Alternatively, the PC 30 may transmit an edit flag value as well as the save instruction.

Figure 12:
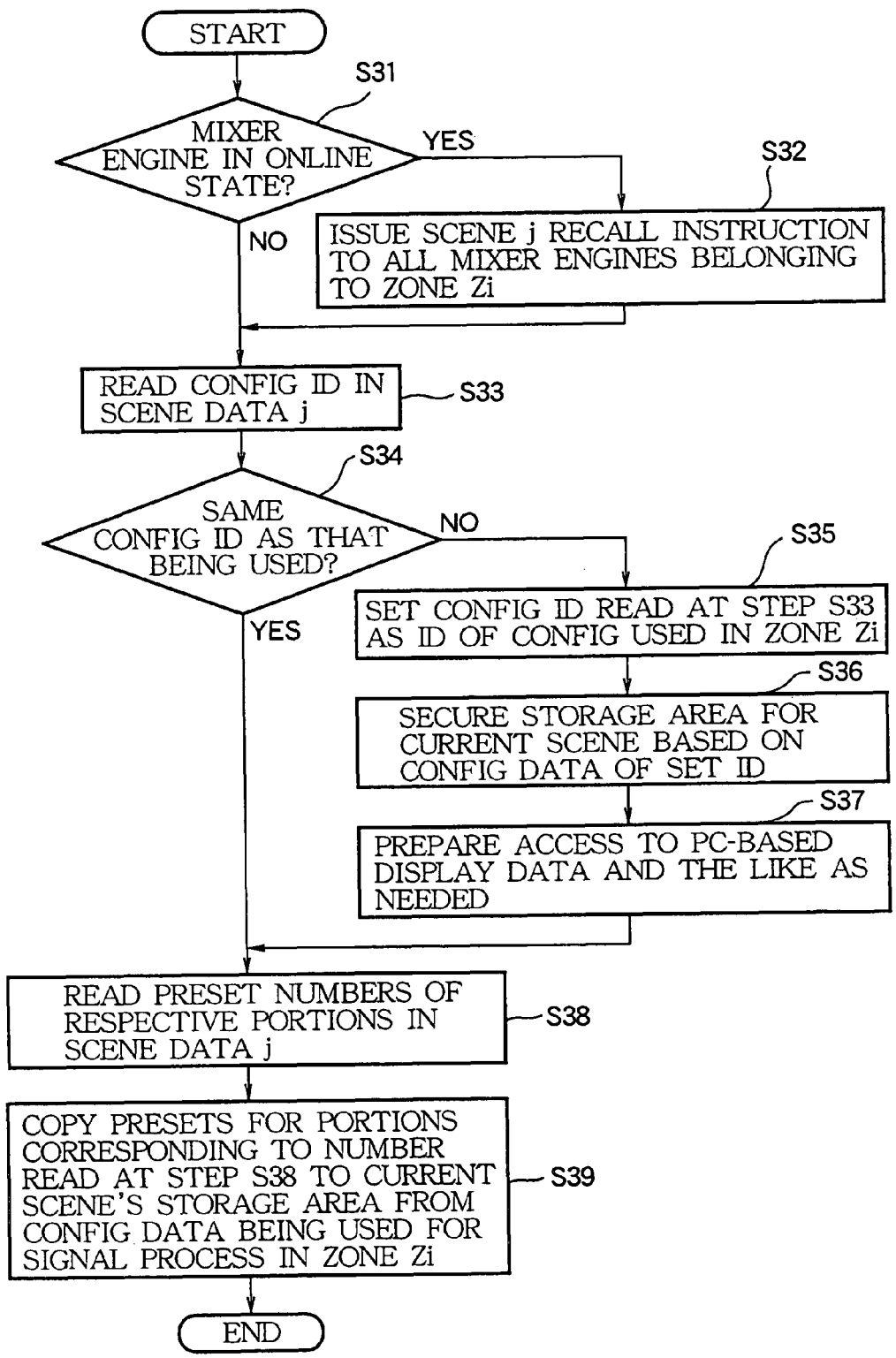
FIG. 12 is a flowchart of the process performed by the PC's CPU shown in FIG. 2 when receiving an instruction to recall scene j in zone Zi.

FIG. 12 shows a flowchart of the process performed by the CPU of the PC 30 when receiving an instruction to recall scene j in zone Zi.

When receiving an instruction to call the scene in response to a press of the Recall button 102, the CPU of the PC 30 starts the process according to the flowchart in FIG. 12. When the mixer engine 10 is in the online state, the process proceeds to step S32 from step S31. The process references the zone Zi management data and issues a scene j recall instruction to all the mixer engines 10 belonging to zone Zi. This instruction is used to allow the mixer engine 10, like the PC 30, to recall scene j and ensure the identity of the current scene in both after the scene is recalled. The instruction can allow the mixer engine 10 to perform the sound signal process according to the contents of scene j that was recalled. When the mixer engine 10 is in the non-online state, the process proceeds directly to step S33 from step S31.

At step S33, the process reads the config ID in scene data j that indicates the contents of scene j. When the ID differs from the ID of the config being used, the process proceeds to steps S35 through S37 from step S34. The process sets the config ID read at step S33 as the ID of the config used in zone Zi. The process secures a storage area for the current scene based on the config data for the ID. The process prepares an access to PC-based display data and the like as needed to enable display of the signal process configuration associated with a new config. The process then proceeds to step S38 and later.

When both config IDs are the same at step S34, it is needless to change the storage area and the like for the current scene. The process directly proceeds to step S38 and later from step S34.

At steps S38 and S39, the process reads preset numbers of the respective portions in scene data j. The process copies presets for the portions corresponding to the read numbers to the current scene's storage area from the config data being used for the signal process in zone Zi. The process then terminates.

Using this process, the PC 30 can read parameters used for the signal process configuration associated with the specified scene and the signal process according to the configuration. In addition, the PC 30 can instruct the mixer engine 10 to perform the signal process in accordance with the signal process configuration and the parameters.

Figure 13:
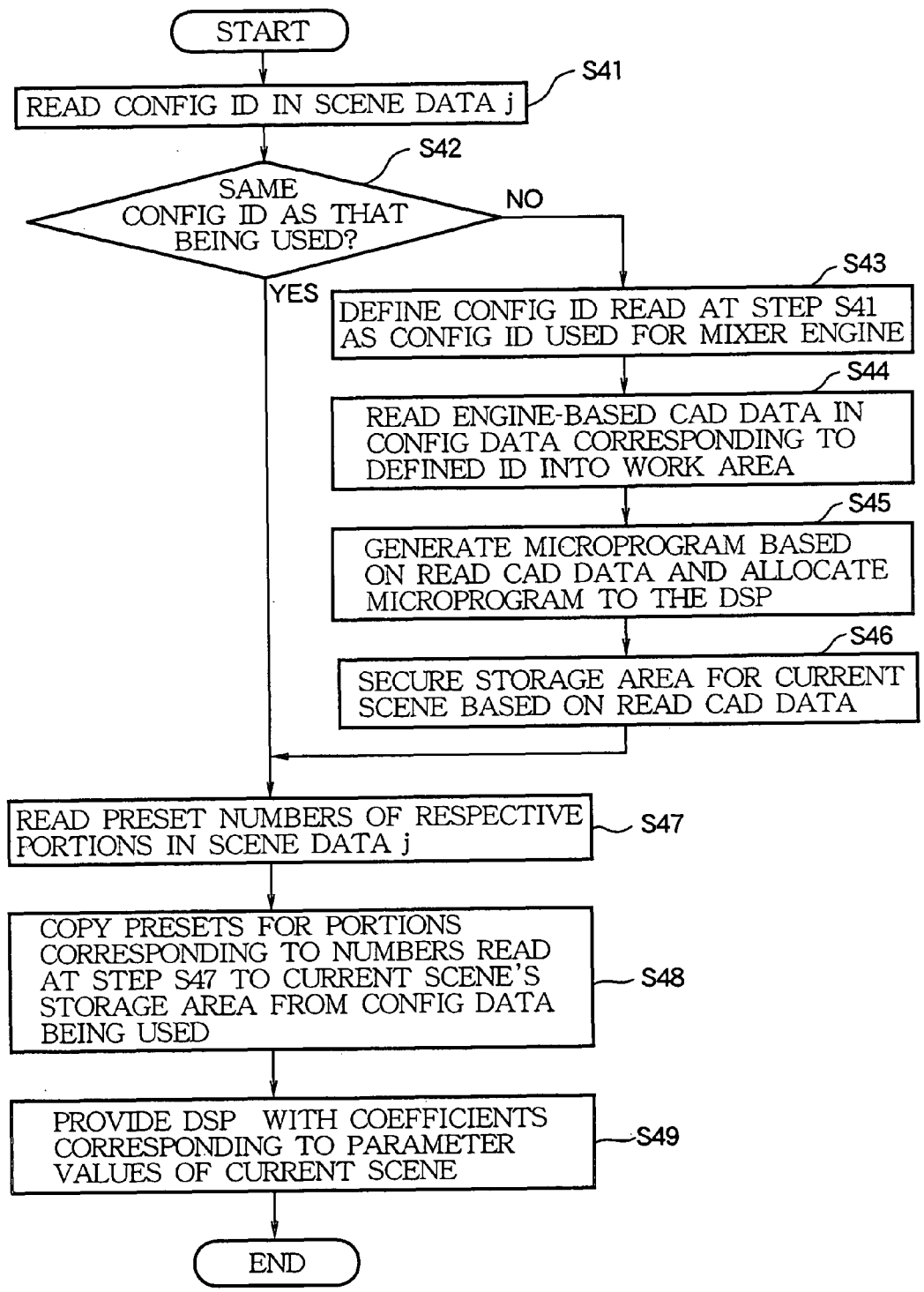
FIG. 13 is a flowchart of the process performed by the mixer engine's CPU shown in FIG. 1 when receiving an instruction to recall scene j.

FIG. 13 shows a flowchart of the process performed by the CPU 11 of the mixer engine 10 when receiving a scene j recall instruction.

The CPU 11 of the mixer engine 10 starts the process according to the flowchart in FIG. 13 when the PC 30 receives the scene j recall instruction issued at step S32 in FIG. 12.

At step S41, the process reads a config ID in scene data j. When that ID differs from the config ID being used for the signal process, the process proceeds to steps S43 through S46 from step S42. The process defines the config ID read at step S41 as the config ID used for the mixer engine itself (S43). The process reads engine-based CAD data in the config data corresponding to the ID into the work area (S44). The process references preset component data and the like based on the CAD data. The process generates a microprogram to perform a signal process associated with the defined config and allocates the microprogram to the DSP 20 (S45). Thereafter, the process secures a storage area for the current scene based on the read CAD data (S46) and then proceeds to step S47 and later.

When both config IDs are the same at step S42, it is needless to change the storage area and the like for microprogram and the current scene. The process directly proceeds to step S47 and later from step S42.

At steps S47 through S49, the process reads preset numbers of the respective portions in scene data j (S47). The process copies presets for the portions corresponding to the read numbers to the current scene's storage area from the config data being used (S48). The process provides the DSP 20 with coefficients corresponding to the parameter values for the copied current scene to perform the signal process (S49) and then terminates.

Using this process, the mixer engine 10 can perform the signal process in accordance with the signal process configuration and parameters related to the specified scene.

Figure 14:
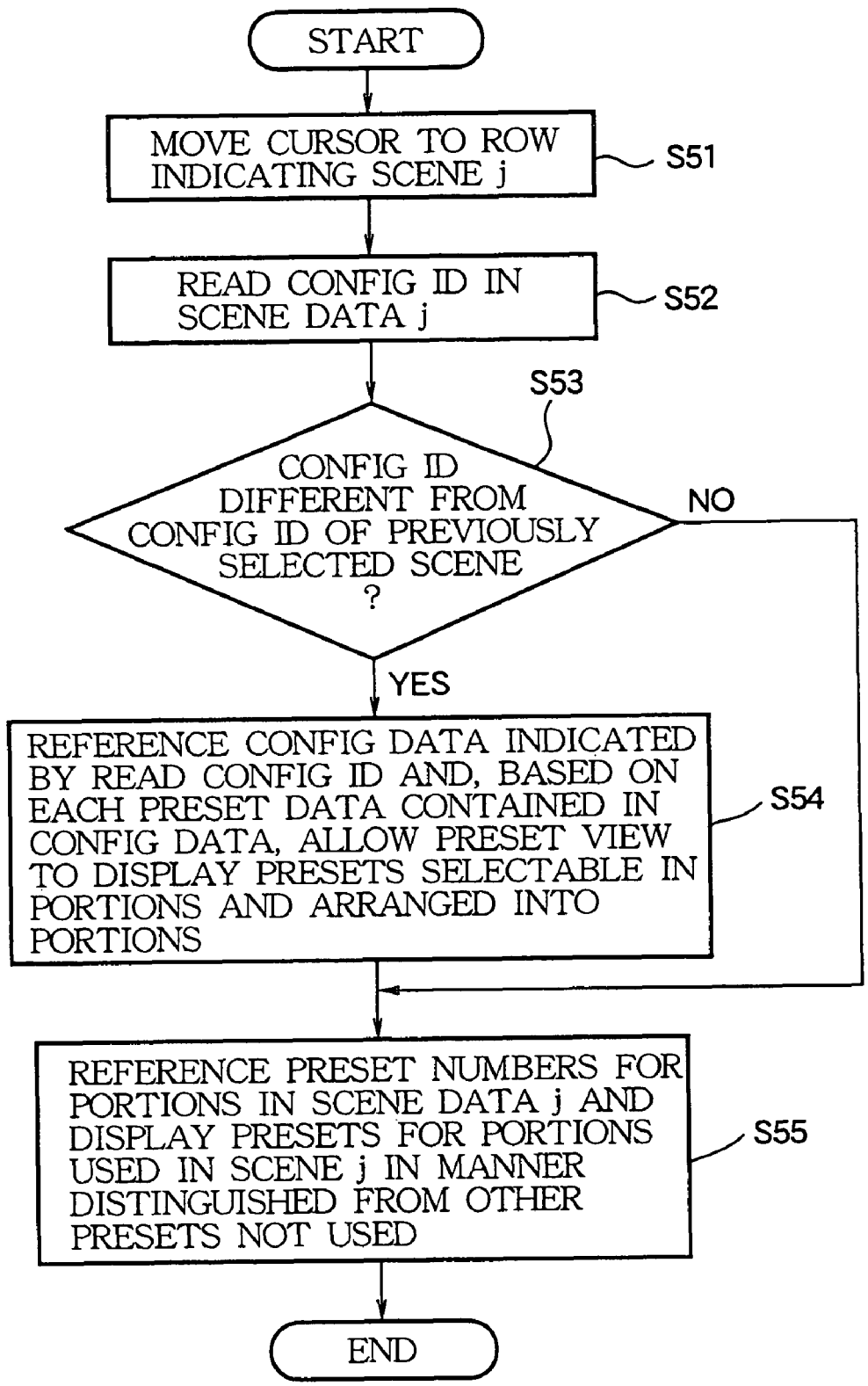
FIG. 14 is a flowchart of the process performed by the PC's CPU shown in FIG. 2 when scene j is selected in the scene list.

FIG. 14 shows a flowchart of the process performed by the CPU of the PC 30 when scene j is selected in the scene list.

When a scene is selected from the scene list 110, the CPU of the PC 30 starts the process according to the flowchart as shown in FIG. 14. The process moves the cursor to the row indicating the selected scene j (S51). The process reads the config ID in scene data j indicating the scene contents (S52).

When the read config ID differs from the config ID of the previously selected scene, the process proceeds to step S54 from step S53 to reference config data indicated by the read config ID. Based on each preset data contained in the config data, the process allows the preset view 120 to display presets selectable in the portions classified into each of the portions. This display is equivalent to the tree display as exemplified in FIG. 8.

When both config IDs are the same at step S53, there is no need to update the preset display. The process directly proceeds to step S55.

At step S55, the process references preset numbers for the portions in scene data j. The process allows the preset view 120 to display the presets for the portions used in scene j distinguished from the other presets, and then terminates. This display is equivalent to the radio button 124 and the mark 124a as exemplified in FIG. 8.

When a scene is selected from the scene list 110, the PC 30 can perform the above-mentioned process to accordingly update the display of the scene memory edit screen 100.

Figure 15:
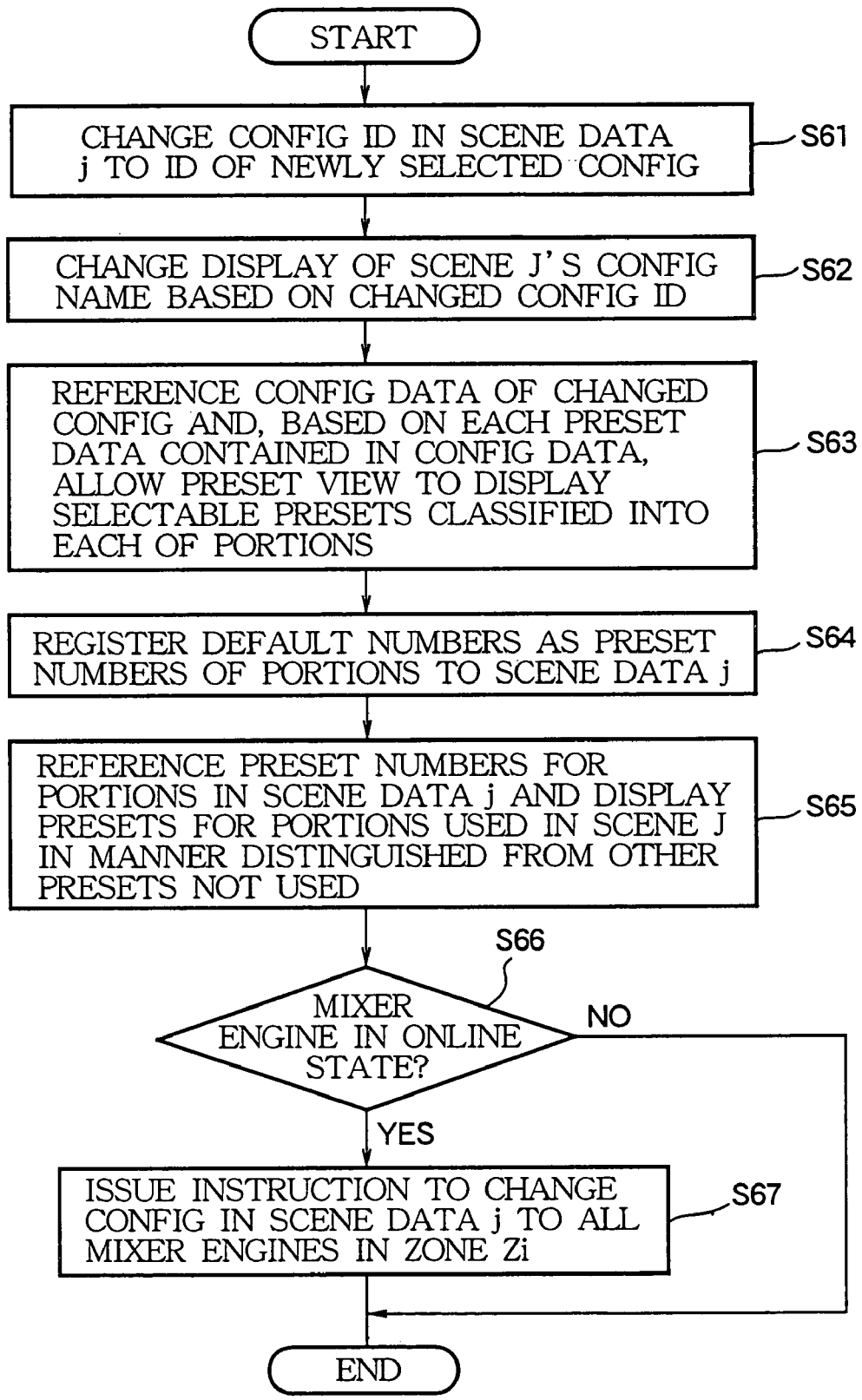
FIG. 15 is a flowchart of the process performed by the PC's CPU when an instruction is issued to change the config of scene j in zone Zi.

FIG. 15 shows a flowchart of the process performed by the CPU of the PC 30 when an instruction is issued to change the config for scene j in zone Zi.

The CPU of the PC 30 starts the process according to the flowchart in FIG. 15 when an instruction to change the config is issued to the name display column 113 and the like in the scene list 110. There may be various methods of accepting the instruction. One method is to select a config different from the original one in the combo box displayed in the config name display column 113. The following describes the process according to this method of accepting the change instruction.

When an instruction is issued to change the scene whose contents are indicated by scene data j, the process first changes the config ID in scene data j to the ID of a newly selected config (S61). The process changes the display of the scene's config name to the display of the changed config name (S62).

At step S63, like step S54 in FIG. 14, the process references the config data concerning the changed config to update the display of presets in the preset view 120. Further, the process registers default numbers as preset numbers of the portions to scene data j (S64). Like step S55 in FIG. 14, the process references the numbers to display the presets used in the changed scene j distinguished from the other presets.

When it is determined at step S66 that the mixer engine 10 is in the online state, the process issues an instruction to change config ID in scene data j to all the mixer engines in zone Zi (S67) and then terminates. When the mixer engine 10 is in the offline state, the process terminates directly.

When the scene list 110 is used to accept an instruction to change the config, the above-mentioned process can accordingly update the contents of the scene data and the display contents of the preset view 120. Updating the display contents of the preset view 120 allows acceptance of an instruction to change only the config for the scene selected in the scene list 110. When the config is changed for an unselected scene, it is unnecessary to update the contents of the preset view 120.

In response to the config change instruction, the mixer engine 10 performs a process, although not shown, to simply change the contents of scene data j. This process may be similar to the process at steps S61 and S64 in FIG. 15.

Figure 16:
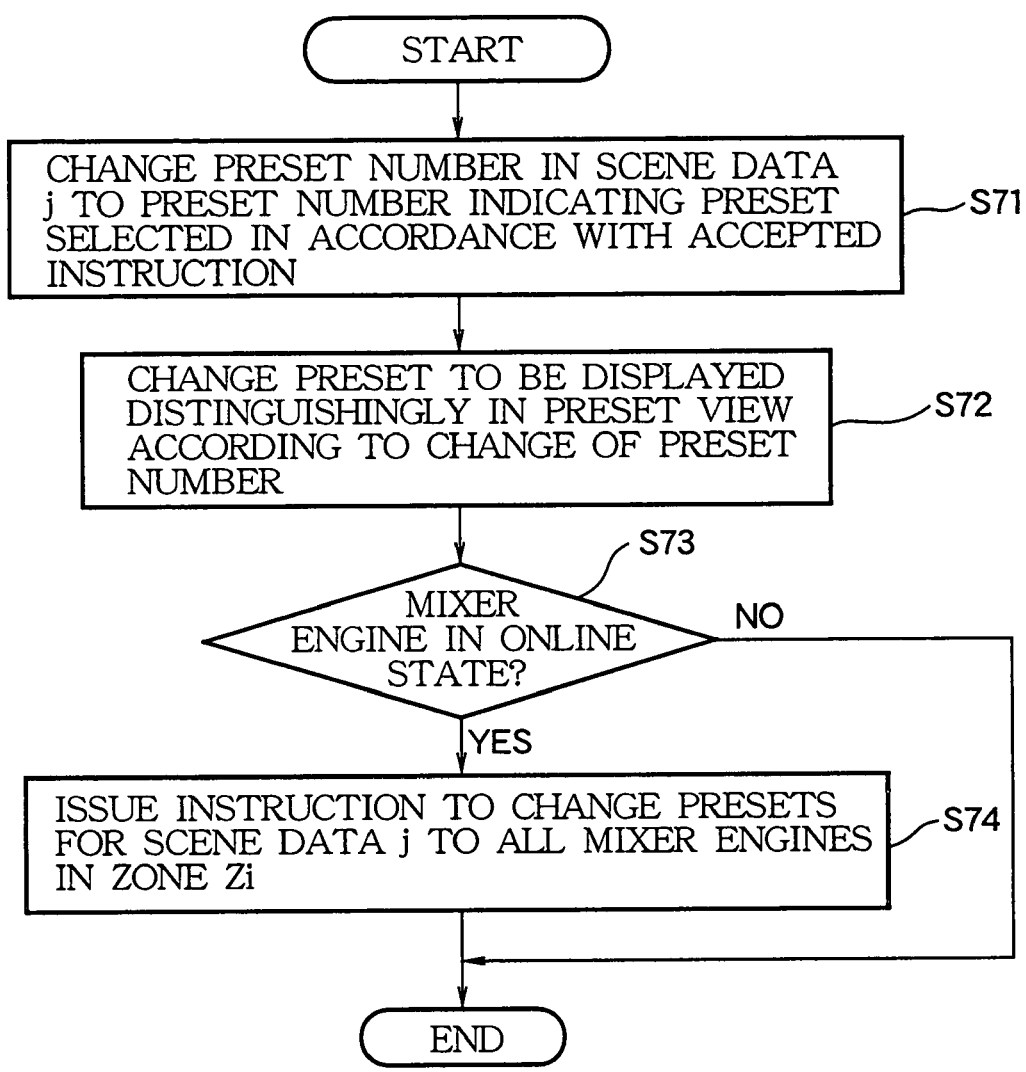
FIG. 16 is a flowchart of the process performed by the PC's CPU when an instruction is issued to change the preset of scene j in zone Zi.

FIG. 16 shows a flowchart of the process performed by the CPU of the PC 30 when an instruction is issued to change presets for scene j in zone Zi.

The CPU of the PC 30 starts the process according to the flowchart in FIG. 16 when the radio button 124 is operated in the preset view 120 to issue an instruction to change a preset. There may be various methods of accepting the instruction. One method is to select a preset different from the original one by means of an operation of the radio button 124. The following describes the process according to this method of accepting the change instruction.

When an instruction is issued to change the scene whose contents are indicated by scene data j, the process first changes the preset number in scene data j to a preset number indicating the preset selected in accordance with the accepted instruction (S71). When a preset to be displayed in the preset view 120 needs to be distinguished from the other presets, the process changes that preset according to a change of its preset number (S72).

When it is determined at step S73 that the mixer engine 10 is in the online state, the process issues an instruction to all the mixer engines in zone Zi (S74) so as to change the preset number in scene data j like the PC 30. The process then terminates. When the mixer engine 10 is in the offline state, the process terminates directly.

When the preset view 120 is used to accept an instruction to change the preset, the above-mentioned process can accordingly update the contents of the scene data and the display contents of the preset view 120.

In response to the preset change instruction, the mixer engine 10 performs a process, although not shown, to simply change the contents of scene data j. This process may be similar to the process at step S71 in FIG. 16.

Figure 17:
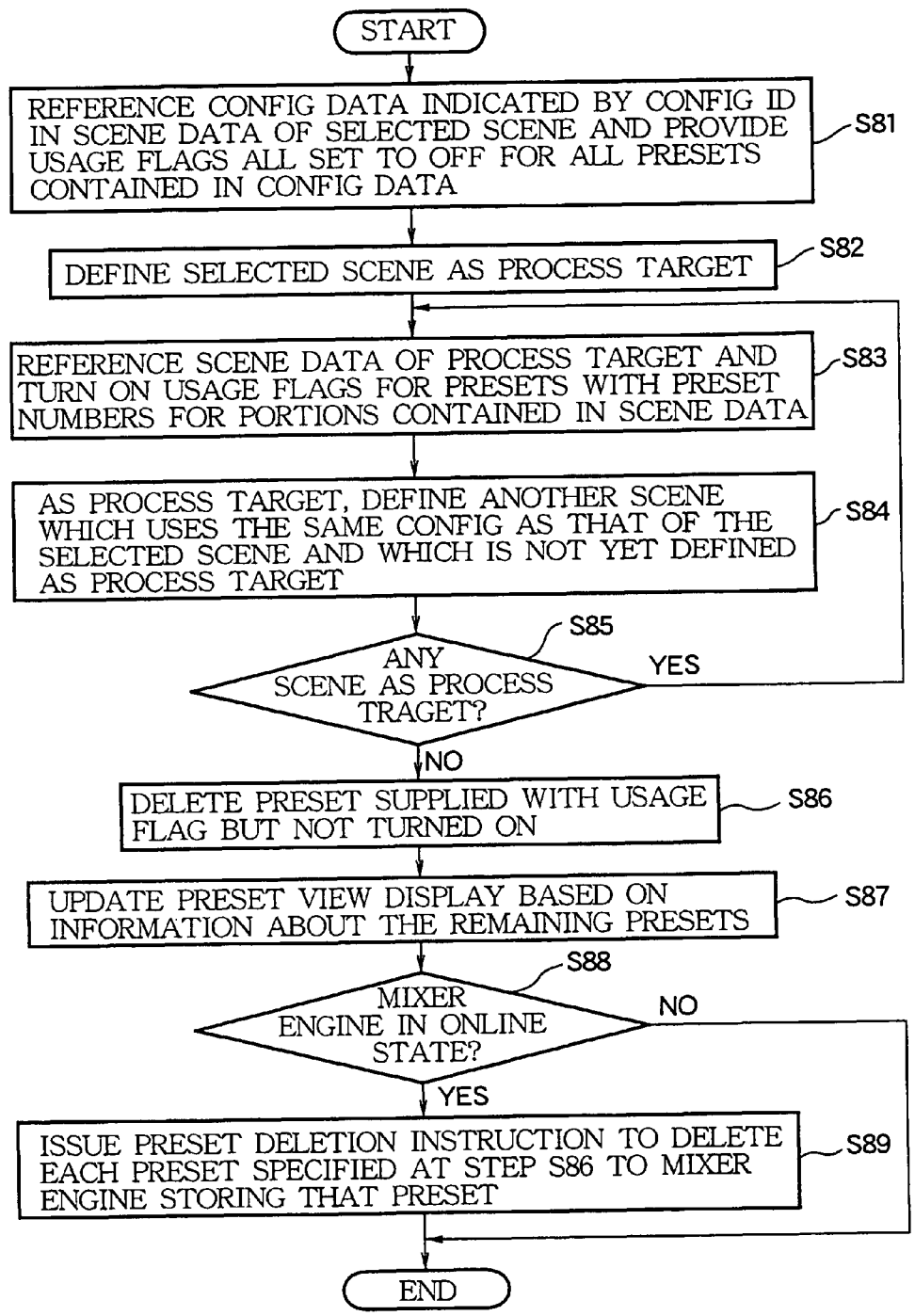
FIG. 17 is a flowchart of the process performed by the PC's CPU when an instruction is issued to delete an unused preset.

FIG. 17 shows a flowchart of the process performed by the CPU of the PC 30 when an instruction is issued to delete an unused preset.

The CPU of the PC 30 starts the process according to the flowchart in FIG. 17 when an instruction to delete unused presets by pressing the Del Unused button 107 and the like.

At step S81, the process references the config data indicated by the config ID in the scene data concerning the scene selected in the scene list 110. The process provides usage flags set to off for all presets contained in the config data.

The process defines the scene selected in the scene list 110 as a process target (S82). The process references scene data concerning the scene as the process target and turns on the usage flags for presets with the preset numbers for the portions contained in the scene data (S83). The process is repeated (S84 and S85) for all scenes that use the same config as that of the selected scene. These scenes are defined as process targets successively.

Let us consider a config used by a scene selected in the scene list 110, i.e., a config that displays information about a preset in the preset view 120. In such config, the process so far turns on the usage flag for the preset to be used for any of the scenes. On the other hand, a preset with the usage flag turned off is not used for any scenes. At step S86, the process deletes such preset. The process then updates the preset view display based on the information about the remaining presets (S87). This update process is similar to that at steps S63 and S65 in FIG. 15.

When the mixer engine 10 is in the online state at step S88, the process proceeds to step S89. The process issues a preset deletion instruction to delete each of the presets deleted at step S86 to the mixer engine 10 storing the preset (S89). The process then terminates. When the mixer engine 10 is in the offline state, the process terminates directly.

The above-mentioned process can delete presets not used for any scenes in accordance with user's instructions. Using the preset view 120, the user can easily confirm the remaining presets after the deletion. If a preset is deleted inadvertently, an undo function can be used to easily resume the original state. When sequential preset numbers are used. It is a good practice to renumber the presets for each portion after step S86. It is also a good practice to change the preset numbers for each scene to be processed so as to keep the reference relationship between the presets unchanged.

While there has been described the example of deleting only the config used for the selected scene, the present invention is not limited thereto as mentioned above. When all configs in the zone need to be deleted, for example, it may be preferable to provide usage flags for all presets contained in the configs belonging to the zone. It just needs to repeat the process from steps S83 to S85 by sequentially defining all scenes in the scene data group as process targets.

In response to the preset deletion instruction, the mixer engine 10 performs a process, although not shown, that simply deletes a specified preset.

The above-mentioned mixer system divides parameters needed for the signal process into a plurality of portions. The system defines a set of parameter values for each portion as a preset. To perform the signal process, the system selectively combines presets for the portions to generate a set of overall parameters (scene). There may be a case of saving a plurality of scenes that simply need to change the contents of some presets. In such case, the above-mentioned system can be configured to reference a common preset for the remaining presets. This makes it possible to decrease the memory capacity needed to save scenes.

When the system is so large as to use a plurality of mixer engines, the overall scene size becomes huge. Also in consideration of only one mixer engine, the need to perform a complex signal process increases the scene size. In such case, it is considered to be effective to adopt the above-mentioned method of selectively combining presets for the portions.

The above-mentioned scheme slightly complicates the scene data configuration. As shown in FIG. 8, however, the scene memory edit screen is displayed on the display of the PC 30 to accept instructions to recall, save, and edit scenes. The user can specify or edit scenes used for the signal process in a manner capable of easily identifying the scene contents.

For example, the scene list 110 can be used to reference the names of configs used for the scenes. The adjacent preset view 120 can be used to confirm states of the presets concerning the config used for the selected scene. By proceeding with this confirmation, the user can easily change the config and presets to be used. Further, the Del Unused button 107 can be used to easily select and delete unneeded presets to decrease the data capacity. Consequently, it becomes possible to improve the operability of specifying and editing one scene and help the user easily do these works.

While there has been described the specific embodiment, the present invention is not limited thereto. For example, the manner of categorizing the preset data is not limited to that shown in FIGS. 5 and 7. It is preferable to categorize scenes concerning a sound signal process performed by a plurality of mixer engines at least in units of mixer engines. This is because the categorization is easy during transfer of preset data to the mixer engines. However, this is not mandatory. The preset data may not be categorized within the mixer engine. The preset data may be categorized based on the other criteria than the slots and components. Further, the respective mixer engines need not use the same categorization method.

Obviously, the present invention is also applicable to a parameter supply apparatus intended for a mixer engine that does not use the above-mentioned concept of areas and zones or does not function cooperatively with the other mixer engines. Further, the present invention is also applicable to a standalone mixer independently of the control apparatus such as the PC 30 when the mixer engine itself is provided with or is connected to a fully functional operation device or display device. In such case, the mixer itself functions as the sound signal processor and the parameter supply apparatus.

Moreover, the present invention may be applicable to a parameter supply apparatus intended for the other sound signal processors such as electronic musical instruments, synthesizers, and sound source devices other than the mixer. The present invention can be applied to a parameter supply apparatus intended for any signal processors that process signals other than sound signals.

The mixer system may use a special-purpose control apparatus or parameter supply apparatus instead of the PC 30. In addition, necessary modifications can be made to the screen display formats, the data formats, process contents, hardware configuration, and the like.

As described above, it will be apparent that the parameter supply apparatus and the program according to the present invention makes it possible to efficiently specify the signal process configuration of a sound signal process performed by the sound signal processor and specify parameter values used to perform the sound signal process. Therefore, the present invention can be used to provide the sound signal processor and the sound signal process system with enhanced operability.

What is claimed is:

1. A parameter supply apparatus using a display for supplying a sound signal processor apparatus with one of a plurality of configurations of sound signal process performed by the sound signal processor apparatus and a set of parameters for use in performing the sound signal process according to the configuration, the parameter supply apparatus comprising:

a configuration storage section that stores a plurality of pieces of configuration data representing the plurality of the configurations;

a parameter storage section that stores, for each piece of the configuration data, a plurality of sets of parameters;

a scene storage section that stores a plurality of scenes, each scene containing first data and second data, the first data indicating one piece of configuration data in said configuration storage section, the second data indicating one set of parameters in said parameter storage section, among the sets of parameters corresponding to the one piece of configuration data indicated by the first data;

a first display control section that controls the display to present a scene list in which items of the scenes stored in the scene storage section are listed, each item listed in the scene list containing a scene identification of a scene and a configuration identification of the one piece of configuration data indicated by the first data contained in the scene;

a scene selection acceptance section that accepts selection of an item from the scene list presented on the display by a user;

a second display control section that controls the display to present a preset view in which preset identifications of the sets of parameters stored for a piece of configuration data indicated by first data contained in a selected scene corresponding to the selected item are presented, and one of the preset identifications corresponding to one set of parameters indicated by second data contained in the selected scene is presented in a manner distinguishable from the others of the preset identifications; and a data provision section that, in response to an instruction to recall a scene by the user, provides the sound signal processor apparatus with a piece of configuration data in said configuration storage section indicated by the first data contained in the selected scene, and a set of parameters in said parameter storage section indicated by the second data contained in the selected scene for enabling the sound signal processor apparatus to perform the sound signal process in accordance with a configuration represented by the provided piece of configuration data while using the provided set of parameters.

2. The parameter supply apparatus according to claim 1, further comprising:

a change instruction acceptance section that accepts an instruction to change the first data contained in the selected scene corresponding to the selected item in the scene list presented in the display; and an update section that operates in response to the accepted instruction for changing the first data to indicate updating a piece of configuration data different than before, and controlling the display to change the preset view to present preset identifications of the sets of parameters stored for the piece of configuration data.

3. The parameter supply apparatus according to claim 1, further comprising:

a selection acceptance section that accepts selection of a preset identification from the preset identifications of the sets of parameters presented in the preset view presented on the display; and an update section that operates, when the selected preset identification is not one of the preset identifications corresponding to the one set of parameters indicated by the second data of the selected scene corresponding to the selected item in the scene list presented in the display, for changing the second data to indicate one set of parameters corresponding to the selected preset identification.

4. The parameter supply apparatus according to claim 1, further comprising:

a delete instruction acceptance section that accepts an instruction to delete an unused preset identification from the preset identifications of the sets of parameters presented in the preset view; and a deleting section that, in response to the accepted instruction, deletes any set of parameters of which the preset identification is presented in the preset view but which is not indicated by any second data in any scene data in said scene storage section, and deletes any preset identification corresponding to the, deleted set of parameters.

5. The parameter supply apparatus according to claim 1, wherein a piece of configuration data representing two configurations among the plurality of pieces of configuration data stored in the configuration storage section is used for configuring the sound signal processor apparatus and another sound signal processor apparatus, wherein the plurality of scenes include a particular scene, the particular scene containing first data indicating the piece of configuration data, second data corresponding to the sound signal processor apparatus and another second data corresponding to the another sound signal processor apparatus, wherein the parameter storage section stores, for the piece of configuration data representing the two configurations, a set of parameters corresponding to the sound signal processor apparatus and a set of another parameters corresponding to the another sound signal processor apparatus, and wherein the preset view presents preset identifications of the sets of parameters of the signal processor apparatus and other preset identifications of the sets of another parameters of the another sound signal processor apparatus when the particular scene is selected from the scene list.

6. The parameter supply apparatus according to claim 1, wherein the plurality of pieces of configuration data representing the plurality of configurations stored in the configuration storage section configure a plurality of components of the sound signal processor apparatus and a plurality of slots equipped in the sound signal processor apparatus for connection with auxiliary devices, and among the plurality of sets of parameters stored in the parameter storage section some of the parameters correspond to the components of the sound signal processor apparatus and others of the parameters correspond to the slots of the sound signal processor.

7. A machine-readable storage medium storing a computer program executable by a computer having a display for carrying out a method of supplying a sound signal processor apparatus with one of a plurality of configurations of sound signal process performed by the sound signal processor apparatus and with a set of parameters for use in performing the sound signal process according to the configuration, the method comprising:

storing a plurality of pieces of configuration data representing the plurality of the configurations;

for each piece of the configuration data, storing a plurality of sets of parameters;

storing a plurality of scenes, each scene containing first data and second data, the first data indicating one piece of configuration data, the second data indicating one set of parameters among the sets of parameters corresponding to the one piece of configuration data indicated by the first data;

controlling the display to present a scene list in which items of the scenes are listed, each item listed in the scene list containing a scene identification of a scene and a configuration identification of the one piece of configuration data indicated by the first data contained in the scene;

accepting selection of an item from the scene list presented on the display by a user;

controlling the display to present a preset view in which preset identifications of the sets of parameters stored for a piece of configuration data indicated by first data contained in a selected scene corresponding to the selected item are presented, and one of the preset identifications corresponding to one set of parameters indicated by second data contained in the selected scene is presented in a manner distinguishable from the others of the preset identifications; and in response to an instruction to recall a scene by the user, providing the sound signal processor apparatus with a piece of configuration data indicated by the first data contained in the selected scene, and a set of parameters indicated by the second data contained in the selected scene for enabling the sound signal processor apparatus to perform the sound signal process in accordance with a configuration represented by the provided piece of configuration data while using the provided set of parameters.

8. The machine-readable storage medium according to claim 7, wherein the method further comprises:

accepting an instruction to change the first data contained in the selected scene corresponding to the selected item in the scene list presented in the display;

in response to the accepted instruction, changing the first data to indicate a piece of configuration data different than before; and controlling the display to change the preset view to present preset identifications of the sets of parameters stored for piece of configuration data.

9. The machine-readable storage medium according to claim 7, wherein the method further comprises:

accepting selection of a preset identification from the preset identifications of the sets of parameters presented in the preset view presented on the display; and changing the second data to indicate one set of parameters corresponding to the selected preset identification when the selected preset identification is not one of the preset identifications corresponding to the one set of parameters indicated by the second data of the scene corresponding to the selected item in the scene list presented in the display.

10. The machine-readable storage medium according to claim 7, wherein the method further comprises:

accepting an instruction to delete an unused preset identification from the preset identifications of the sets of parameters presented in the preset view; and in response to the accepted instruction, deleting any set of parameters of which the preset identification is presented in the preset view but which is not indicated by any second data in any scene data in said scene storage section, and any preset identification corresponding to the deleted set of parameters.

11. The machine-readable storage medium according to claim 7, wherein a piece of configuration data representing two configurations among the plurality of pieces of configuration data stored in the configuration storage section is used for configuring the sound signal processor apparatus and another sound signal processor apparatus, wherein the plurality of scenes include a particular scene, the particular scene containing first data indicating the piece of configuration data, second data corresponding to the sound signal processor apparatus and another second data corresponding to the another sound signal processor apparatus, wherein the parameter storage section stores, for the piece of configuration data representing the two configurations, a set of parameters corresponding to the sound signal processor apparatus and a set of another parameters corresponding to the another sound signal processor apparatus, and wherein the preset view presents preset identifications of the sets of parameters of the signal processor apparatus and other preset identifications of the sets of another parameters of the another sound signal processor apparatus when the particular scene is selected from the scene list.

12. The machine-readable storage medium according to claim 7, wherein the method stores the plurality of pieces of configuration data representing the plurality of configurations which configure a plurality of components of the sound signal processor apparatus and a plurality of slots equipped in the sound signal processor apparatus for connection with auxiliary devices, and stores the plurality of sets of parameters for each configuration, some of the parameters corresponding to the components of the sound signal processor apparatus and others of the parameters corresponding to the slots of the sound signal processor apparatus.

* * * * *